US009839323B2

(12) United States Patent
Parrish et al.

(10) Patent No.: US 9,839,323 B2
(45) Date of Patent: Dec. 12, 2017

(54) QUICK SEAR BARBECUE GRILL AND COMPONENTS THEREOF

(71) Applicant: Daniel Parrish, Austin, TX (US)

(72) Inventors: Daniel Parrish, Austin, TX (US); Randall L. May, Plano, TX (US)

( * ) Notice: Subject to any disclaimer, the term of this patent is extended or adjusted under 35 U.S.C. 154(b) by 0 days.

(21) Appl. No.: 15/425,077

(22) Filed: Feb. 6, 2017

(65) Prior Publication Data
US 2017/0208995 A1  Jul. 27, 2017

Related U.S. Application Data

(63) Continuation of application No. 14/541,020, filed on Nov. 13, 2014, now Pat. No. 9,560,928.

(60) Provisional application No. 61/913,179, filed on Dec. 6, 2013.

(51) Int. Cl.
*A47J 37/07* (2006.01)
*A47J 37/06* (2006.01)

(52) U.S. Cl.
CPC ....... *A47J 37/0713* (2013.01); *A47J 37/0682* (2013.01); *F23N 2035/18* (2013.01); *F23N 2035/24* (2013.01); *F23N 2037/20* (2013.01)

(58) Field of Classification Search
CPC ....... A47J 27/62; A47J 37/0786; F23N 1/007; F23N 2037/20; F23N 2035/24; F23N 2035/18; Y10T 137/86726; F23K 2900/05002
See application file for complete search history.

(56) References Cited

U.S. PATENT DOCUMENTS

| | | | | |
|---|---|---|---|---|
| 2,137,406 A * | 11/1938 | Johnson | .................... | C02F 1/42 137/625.29 |
| 2,148,386 A * | 2/1939 | Wegener | .................. | F23Q 7/10 137/628 |
| 3,183,958 A * | 5/1965 | Davies | ...................... | F23Q 7/10 219/270 |
| 5,235,903 A * | 8/1993 | Tippmann | ................ | A21B 3/04 126/20 |
| 5,370,154 A * | 12/1994 | Greer | ........................ | F16K 5/10 137/625.32 |
| 5,628,242 A * | 5/1997 | Higley | ................ | A47J 37/0713 126/25 R |
| 6,289,792 B1 * | 9/2001 | Grando | ............... | A47J 37/0713 126/25 R |
| 6,520,481 B2 * | 2/2003 | Harneit | ................... | F16K 5/103 137/599.17 |
| 6,575,187 B2 * | 6/2003 | Leys | ..................... | F16K 11/048 137/15.21 |
| 7,159,605 B2 * | 1/2007 | Thrash, Jr. | .............. | F16K 3/265 137/112 |

(Continued)

*Primary Examiner* — Sean Michalski

(57) ABSTRACT

A barbecue grill and components thereof that allow a user to obtain a controlled burst of high intensity heat for a limited period of time, comprising at least one quick sear burner, a quick sear valve assembly adapted for fluid communication with the quick sear burner, and a cooking surface adapted to be positioned above the quick sear burner in or on a firebox of a barbecue grill. The quick sear valve assembly, in turn, comprises a main valve for normal operation of the quick sear burner, and a bypass valve for high intensity heat output of limited duration. The quick sear valve assembly includes a mechanism that is configured to allow the user to selectively actuate the bypass valve.

18 Claims, 19 Drawing Sheets

(56) References Cited

U.S. PATENT DOCUMENTS

| | | | | |
|---|---|---|---|---|
| 2007/0028912 A1* | 2/2007 | Gagas | ............... | A47J 37/0704 126/9 R |
| 2011/0041483 A1* | 2/2011 | Kapparos | ............. | F01N 3/0253 60/288 |
| 2013/0299608 A1* | 11/2013 | Spangler | ................. | B05B 1/08 239/444 |
| 2015/0153048 A1* | 6/2015 | Moro | ..................... | F23N 5/107 99/332 |
| 2015/0165846 A1* | 6/2015 | Sidders | ............... | F16K 15/025 137/12 |
| 2015/0330629 A1* | 11/2015 | Albizuri Landazabal | .......... | F16K 5/0407 431/280 |
| 2016/0076767 A1* | 3/2016 | Super | ................... | F23N 1/002 431/76 |
| 2016/0102867 A1* | 4/2016 | Huang | .................. | F24C 3/126 251/286 |
| 2016/0230992 A1* | 8/2016 | Sweet | ................... | F23N 5/022 |

\* cited by examiner

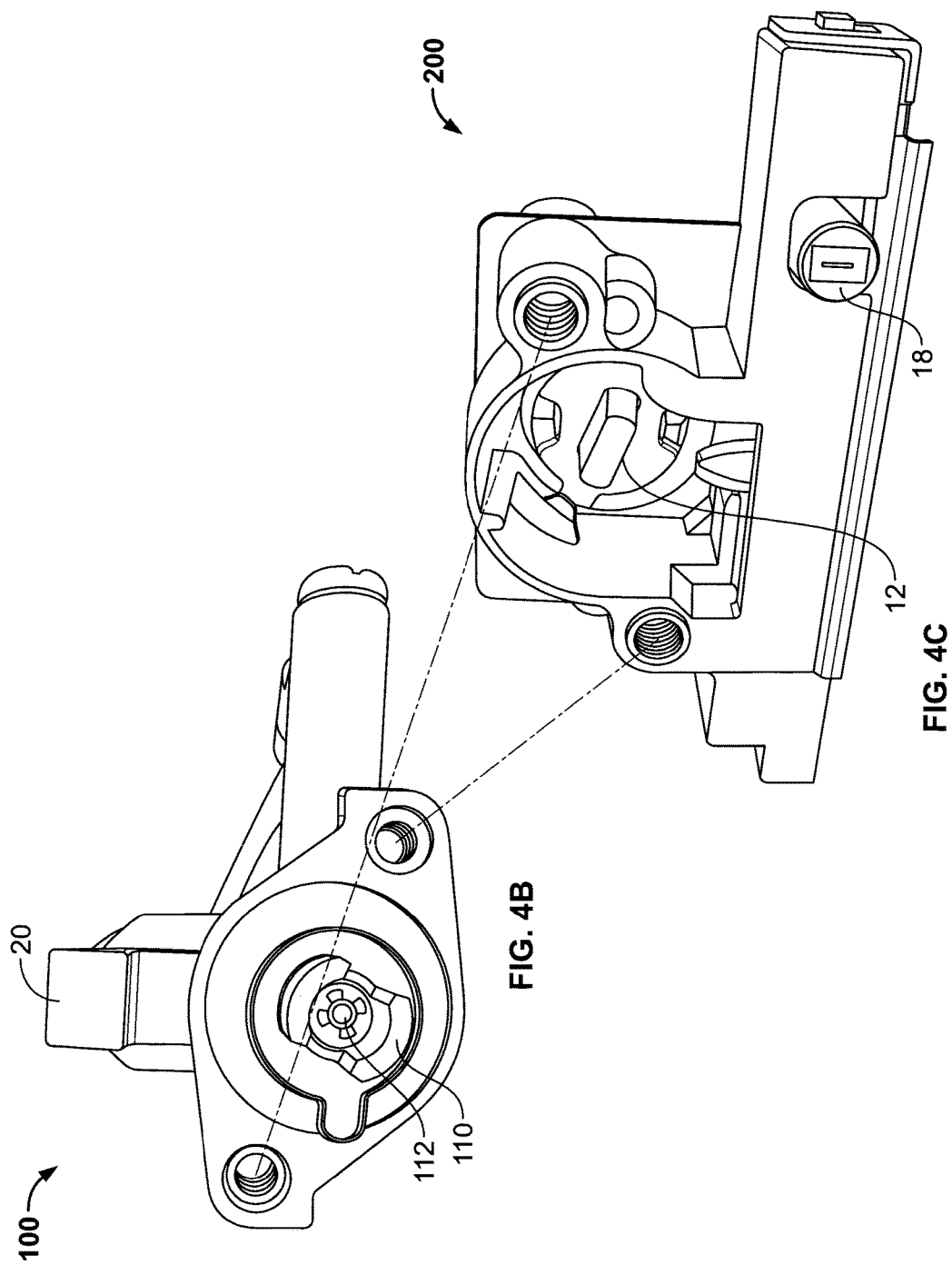

QUICK SEAR BARBECUE GRILL AND COMPONENTS THEREOF

CROSS-REFERENCE TO RELATED APPLICATIONS

This application claims priority from U.S. Provisional Patent Application No. 61/913,179, filed on Dec. 6, 2013, the contents of which are incorporated herein by reference in their entirety.

BACKGROUND OF THE INVENTION

The present invention relates generally to barbecue grills, and more particularly to a barbecue grill that has a quick sear function.

Barbecue grills are generally used to cook food over an open flame. In many cooking applications, particularly in cooking meat, it is desirable to provide an initial "sear" to the food by applying high heat to the food's surface. This searing process quickly evaporates moisture on the surface of the meat to create a crunchy outer crust while keeping the center of the meat moist.

Typically, barbecue grills will include one or more control knobs and control valves that dispense fuel into burners. The control knobs adjust the flow of gas that is able to pass through the valves to adjust the level of heat produced by the burners. In order to "sear" meat, users will generally place a burner on the "high" setting to get the area directly above the burner as hot as possible. The "high" setting on the grill will generally be limited to about 10,000-12,000 BTUs.

It can readily be appreciated that there is a need for a barbecue grill with a burner or burners capable of putting out higher heat outputs to more efficiently and effectively sear food. In particular, there is a need for such a grill providing this capability in a cost effective manner that does not require the material and construction characteristics of a grill designed for continuous operation at such higher heat outputs. The present invention fulfills these needs and provides further related advantages.

SUMMARY OF THE INVENTION

Briefly, and in general terms, the present invention resides in a barbecue grill and components thereof that allow a user to obtain a controlled burst of high intensity heat for a limited period of time.

More specifically, the barbecue grill and components of the present invention comprise at least one quick sear burner, a quick sear valve assembly adapted for fluid communication with the quick sear burner, and a cooking surface adapted to be positioned above the quick sear burner in or on a firebox of a barbecue grill. The quick sear valve assembly, in turn, comprises a main valve for normal operation of the quick sear burner, and a bypass valve for high intensity heat output of limited duration. The quick sear valve assembly includes a mechanism that is configured to allow the user to selectively actuate the bypass valve. The mechanism actuator may be a control knob for the quick sear valve assembly, or it may be separate from the control knob. Moreover, the actuator may embody a "momentary" function in which the bypass valve is actuated only when and so long as the user operates it, or the mechanism itself may be configured to deactivate the bypass valve a predetermined amount of time after actuation without further action by the user.

In a presently preferred embodiment, the quick sear valve assembly has a rotatable valve shaft on which a control knob is mounted to enable the user to adjust the rate of gas flow allowed to pass through the main valve and into the quick sear burner. In use, the quick sear valve assembly has at least two states: a normal state in which gas flows only through the main valve into the quick sear burner, without gas flowing through the bypass valve, and a quick sear state in which gas is allowed to flow through both the main valve and the bypass valve. The quick sear state may be actuated by the user pushing the control knob, and hence the valve shaft, inward to allow gas to flow through the bypass valve and into the quick sear burner. In the quick sear state, the combined gas flows through both the main valve and the bypass valve result in the quick sear burner producing a higher heat output than when the quick sear valve assembly is in the normal state.

Preferably the quick sear valve assembly includes a spring mechanism or the like requiring a minimum force to be constantly applied to the control knob to keep the valve shaft inwardly displaced to actuate the bypass valve. Otherwise, the spring mechanism will cause the valve shaft to return to its normal state to deactivate the quick sear function. In a further embodiment, the quick sear valve assembly may comprise an indicator, such as LED lights, to indicate when the quick sear function is active, and a timer, to indicate the duration of time that the quick sear function has been active. The timer may update constantly so that the user knows exactly the duration of time that the quick sear function has been activated, or, alternatively, the timer may be connected to the indicator, e.g., LED lights, such that when the quick sear function has been active for a pre-determined amount of time, the indicator will indicate that the pre-determined amount of time has passed. For example, LED lights may turn on when the quick sear function is activated, and then turn off after one minute to indicate to the user that the quick sear function has been active for one minute.

In a further embodiment, the quick sear valve assembly may also include an automatic quick sear function. In this embodiment, once the quick sear function has been activated, the user does not need to continue applying pressure to the control knob, and the quick sear function will continue to be active for a pre-determined amount of time, after which the quick sear function will automatically shut off. This automatic quick sear function may be implemented by use of an electromagnet and a timer, such that when the user applies pressure to the control knob to activate the quick sear function, the electromagnet holds the valve shaft in the quick sear function state. Once a pre-determined amount of time has passed, the electromagnet automatically releases the valve shaft and the quick sear function disengages.

In the preferred embodiment, the bypass valve may be actuated only when the control knob and valve shaft have been rotated to a "HIGH" setting, corresponding to substantially maximum gas flow through the main valve. The main valve may be configured for a maximum gas flow rate corresponding to a burner heat output of about 12,000 BTUs, while the bypass valve may be configured for a maximum gas flow rate corresponding to a burner heat output of approximately 16,000 BTUs. Thus, activating the quick sear function can result in burner heat output of as much as 28,000 BTUs for a limited duration.

The barbecue grill and components of the present invention may further comprise a quick sear heat shield positioned above the quick sear burner to laterally disperse heat emitted from the quick sear burner. The quick sear heat shield may be shaped such that flames emitted from the quick sear burner during the quick sear function extend beyond the edges of the quick sear heat shield.

The barbecue grill of the present invention may further comprise a regular burner that is in communication with a regular valve and has a lower maximum heat output than the quick sear burner. The cooking surface may further comprise a plurality of surfaces, including at least one regular surface positioned above the regular burner and one sear surface positioned above the quick sear burner, the regular surface having a different construction and/or surface pattern than the quick sear surface.

Other features and advantages of the invention should become apparent from the following description of the preferred embodiment, taken in conjunction with the accompanying drawings, which illustrate, by way of example, the principles of the invention.

BRIEF DESCRIPTION OF THE DRAWINGS

A presently preferred embodiment of the invention will now be described, by way of example only, with reference to the following drawings.

FIGS. 4B-C provide internal views of the valve body and the shaft body, respectively, shown in FIG. 4A.

DETAILED DESCRIPTION OF THE PREFERRED EMBODIMENTS

Figure 1A:
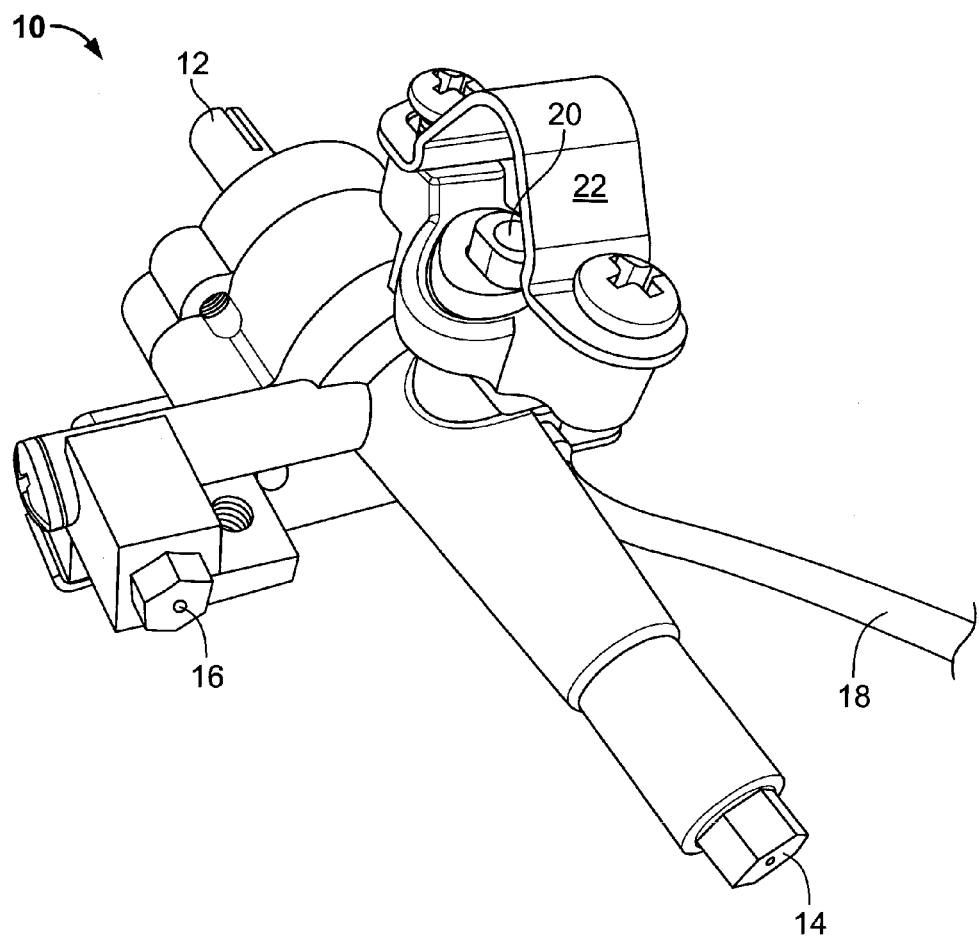
FIGS. 1A-B are rear perspective views of a quick sear valve assembly in accordance with the presently preferred embodiment of the invention.
Figure 1B:
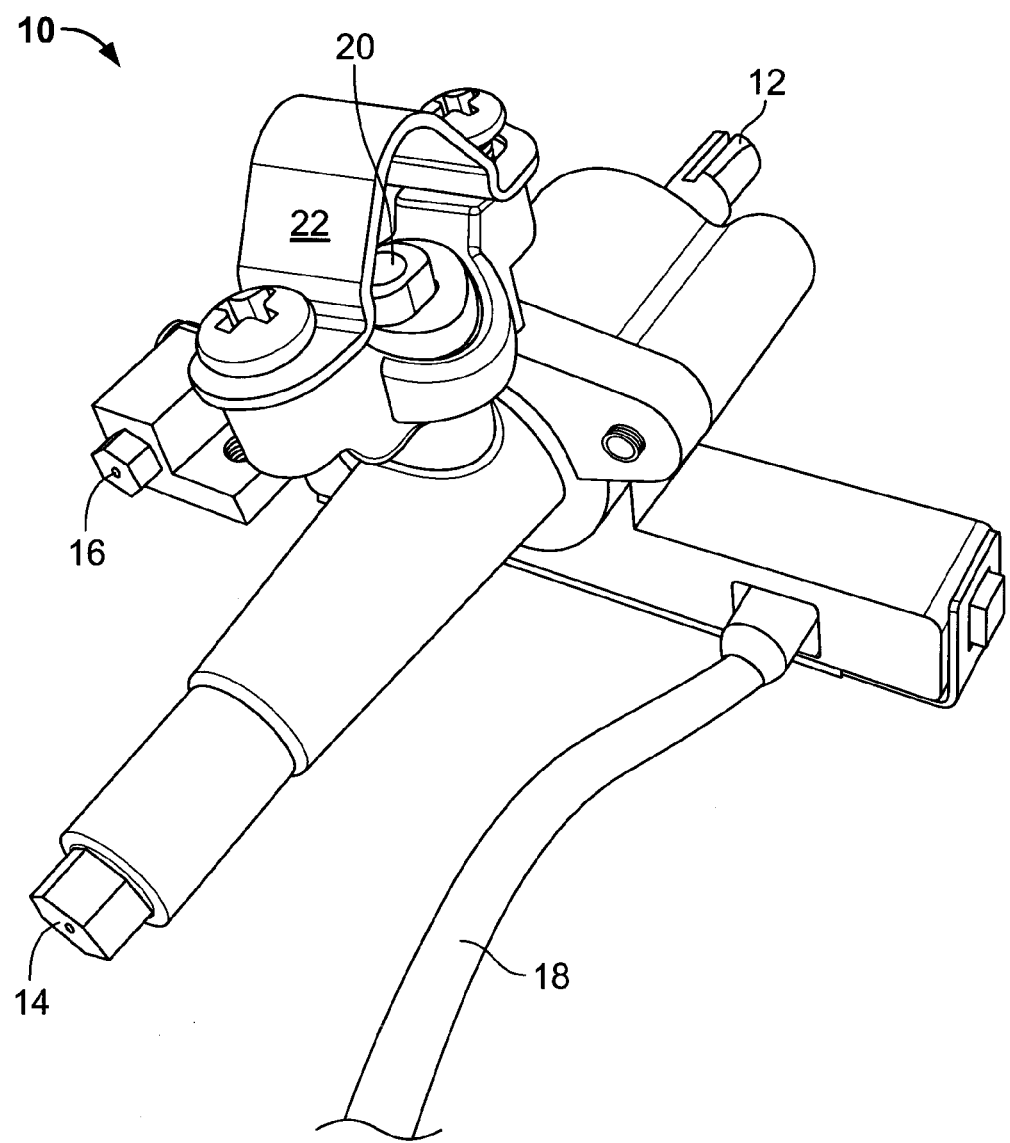
Figure 1C:
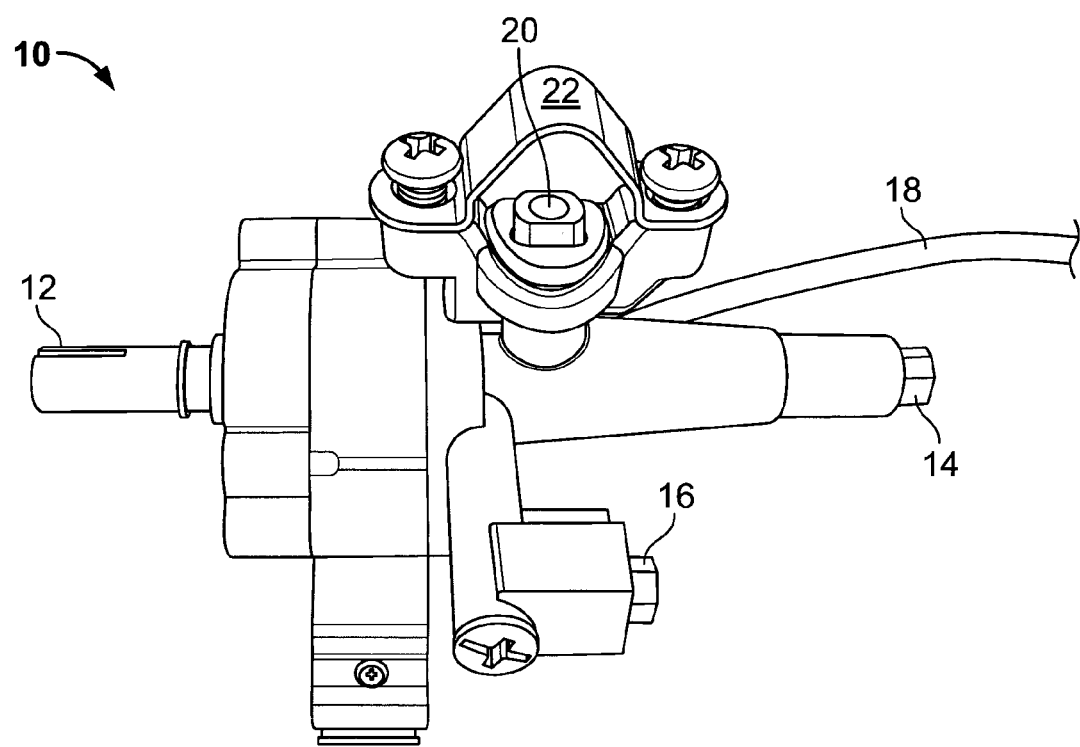
FIG. 1C is a side perspective view of the quick sear valve assembly of FIGS. 1A-B.

Referring now to the drawings, and particularly to FIGS. 1A and 1B thereof, there is shown a quick sear valve assembly 10 that may be used to implement a quick sear function in a quick sear barbecue grill. The quick sear valve assembly, which will be described in greater detail in connection with other figures below, controls the amount of fuel that is delivered to a burner in a barbecue grill, thereby controlling the heat output of that burner. The quick sear valve assembly receives gaseous fuel via a gas inlet 20. The gas inlet includes a mounting bracket 22 to mount the gas inlet on a fuel line. Gas flows through the gas inlet into a main valve 14. The main valve is placed in communication with a burner on a grill such that gas flows through the main valve into the burner. The amount of gas that flows through the main valve into the burner controls the heat output of the burner. A user can adjust the amount of gas flowing through the main valve by rotating a valve shaft 12. The valve shaft typically will be connected to a control knob that a user can rotate to more easily rotate the valve shaft. Rotation of the valve shaft adjusts the flow of gas through the main valve. The quick sear valve assembly shown in FIGS. 1A-C also includes an igniter wire 18 to ignite the burner. In particular embodiments, the quick sear valve assembly may be a piezoelectric or electromagnetic valve.

The quick sear valve assembly 10 also includes a bypass valve 16, which, like the main valve 14, is able to receive gaseous fuel via the gas inlet 20 and is positioned so as to be in communication with a burner in the barbecue grill. In the presently preferred embodiment, the bypass valve and the main valve are connected to the same burner, and provide fuel to a single quick sear burner. As discussed above, the valve shaft 12 can be rotated to adjust the rate of gas flow through the main valve 14. In this normal (i.e., "non-sear") mode of operation, the heat output from the burner attached to the quick sear valve assembly may vary from "low" to "high" or any other indicator of heat output (e.g., numbers from 0-10, or cool to hot, etc.). In the "non-sear" mode of operation, fuel passes only through the main valve into the burner and fuel does not pass through the bypass valve 16. However, when a user wishes to sear a piece of food using controlled bursts of high heat, the user can perform a quick sear function by performing a specific action with the valve shaft to cause fuel to flow through the bypass valve into the quick sear burner. In the presently preferred embodiment, the user can push the valve shaft inward. This inward pressure on the valve shaft results in the bypass valve opening, and gas flowing through the bypass valve at a high rate, producing a correspondingly high heat output by the corresponding burner. The main valve may be configured to produce a gas flow rate corresponding to a heat output of approximately 10,000-14,000 BTU's on the "HIGH" setting, and more particularly, approximately 10,000 to 12,000 BTUs. The bypass valve may be configured to produce a gas flow rate corresponding to a heat output of approximately 9,000 to 16,000 BTUs. In this way, when the user activates the "quick sear" function by pressing inwardly on the valve shaft, the combined gas flow of the main valve and the bypass valve can flow into the burner to approximately double the heat output of the burner, producing a heat output of approximately 20,000 to 28,000 BTUs.

In the disclosed embodiment, the quick sear valve assembly 10 includes a spring mechanism in communication with the valve shaft 12 so that the quick sear function can only be performed while an inward force continues to be applied to the valve shaft 12. Once the user stops applying an inward pressure to the valve shaft, the spring mechanism forces the valve shaft outwards to its normal resting position, resulting in the bypass valve 16 being once again closed off, and normal heat output resumes through the main valve 14. The spring mechanism ensures that the quick sear functionality can only be utilized while a force is applied to the valve shaft.

It should be understood that, while the present disclosure has discussed the presently preferred embodiment in which the quick sear function is activated by inwardly displacing the valve shaft 12, alternative means are contemplated for actuating the quick sear function. For example, a quick sear button or switch, integrated with or separate from the control knob, may be provided that can be depressed or otherwise operated, or the valve shaft may be outwardly displaced or rotated, to activate the quick sear function. In each of these alternative embodiments, a "momentary" function similar to the spring mechanism described above may be implemented so that the quick sear function automatically turns off when the user ceases to operate the actuating mechanism or after a set duration.

Figure 2A:
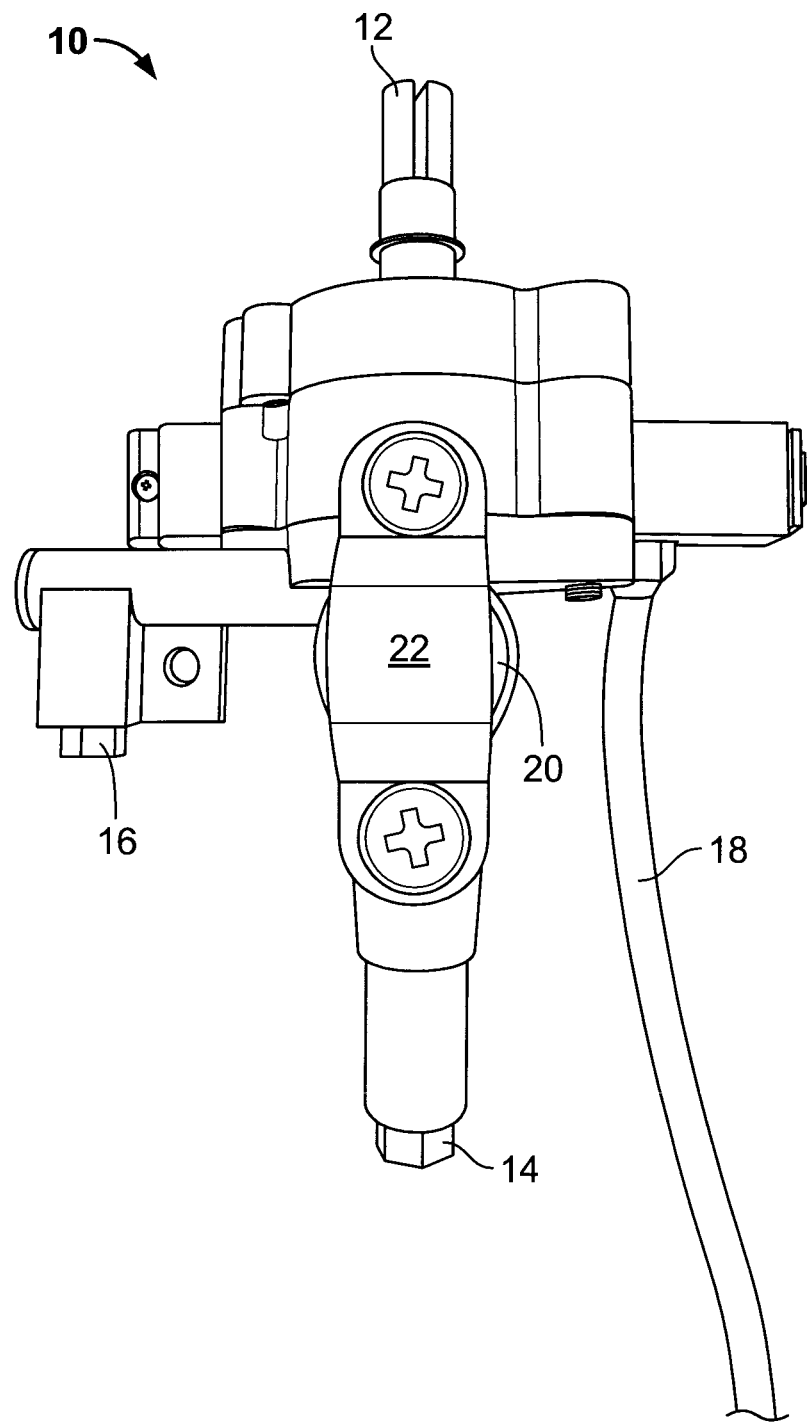
FIG. 2A is a top plan view of the quick sear valve assembly of FIGS. 1A-C.
Figure 2B:
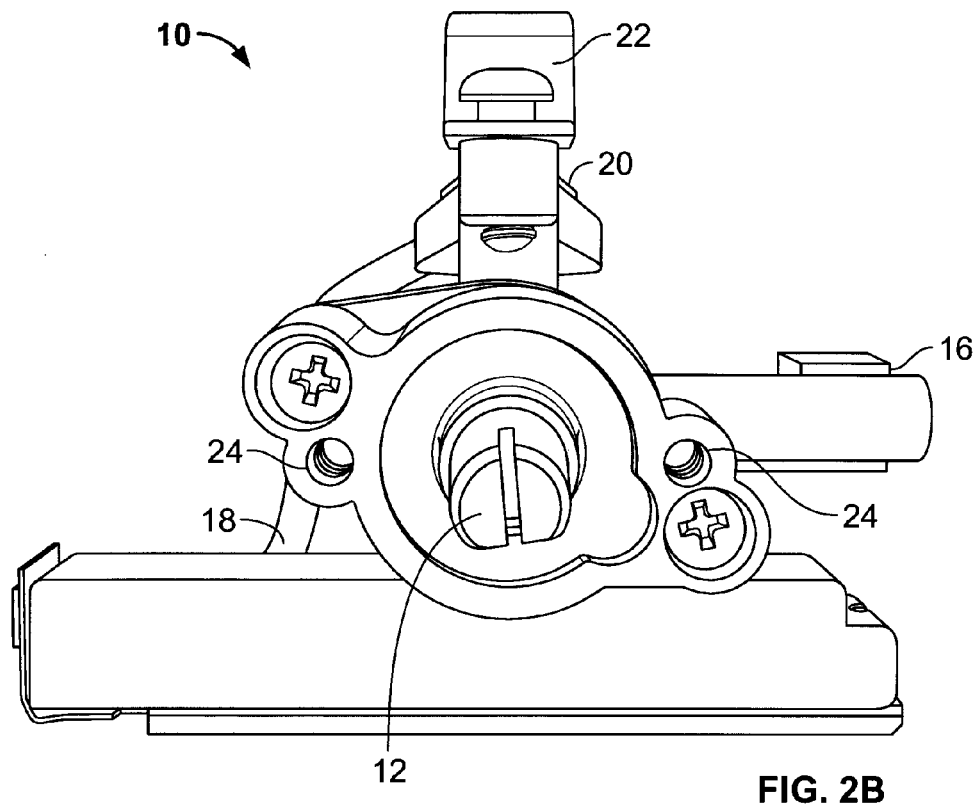
FIGS. 2B and 2C are front and rear plan views, respectively, of the quick sear valve assembly of FIGS. 1A-C.
Figure 2C:
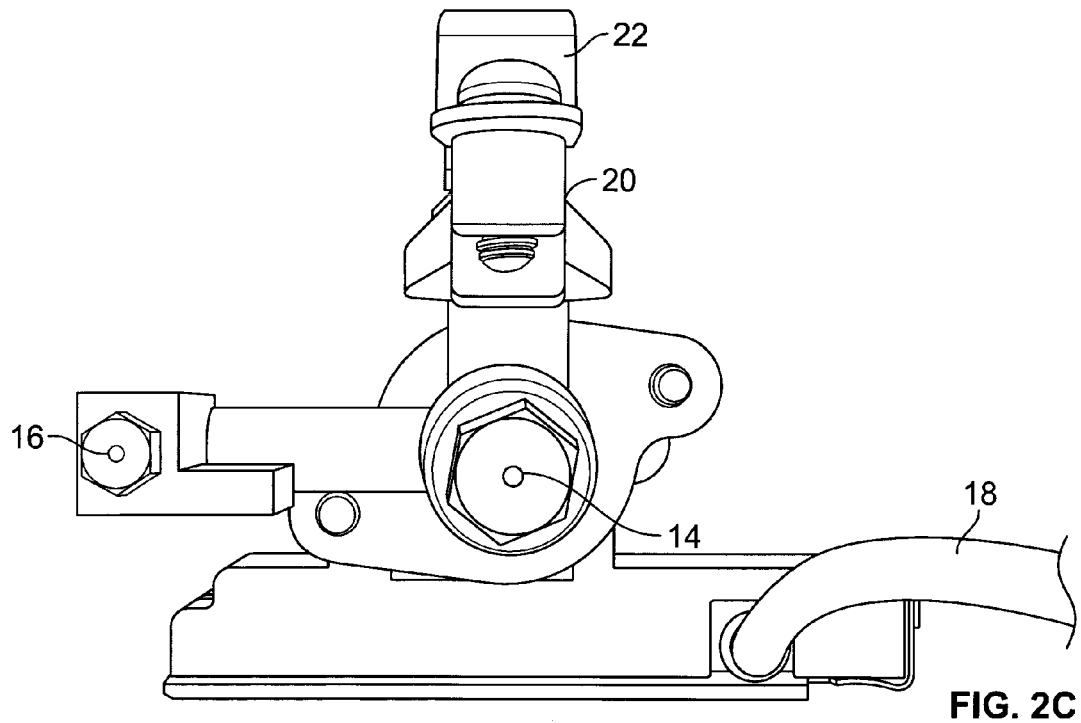
Figure 15A:
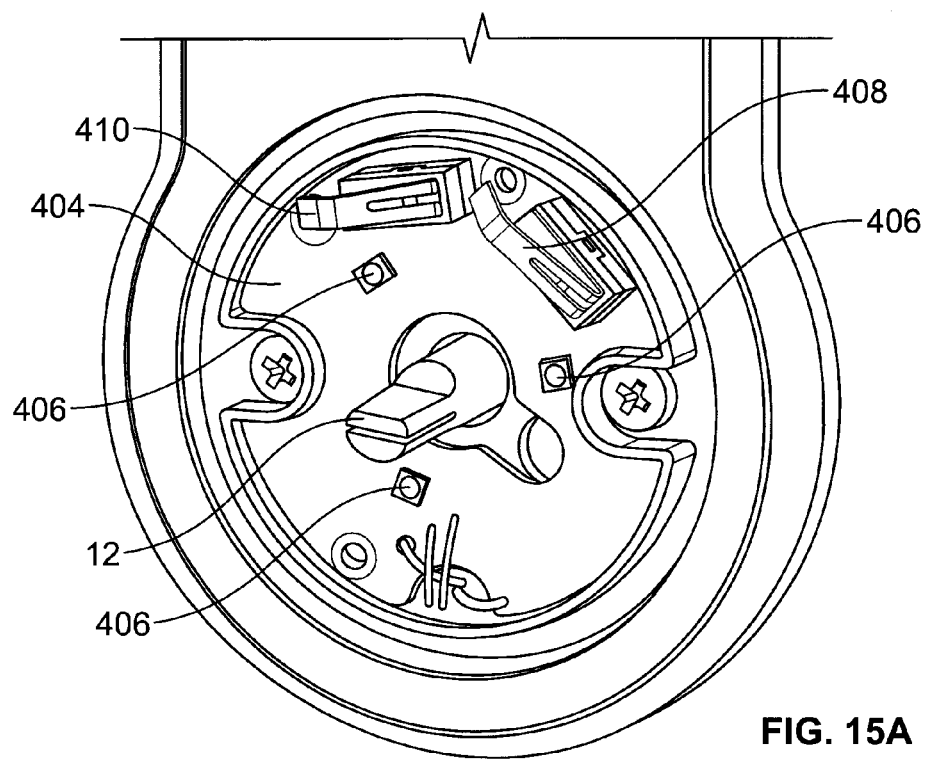
FIG. 15A provides a front-perspective view of a circuit board that may be used to implement particular embodiments of the automatic quick sear mechanism of FIGS. 14A-B.

FIGS. 2A, 2B, and 2C provide top, front, and rear plan views of the quick sear valve assembly 10, respectively. In FIG. 2B, two screw holes 24 are located on either side of the valve shaft 12. These may be used to secure a face plate to the front of the quick sear valve assembly. The face plate may have markings to indicate the heat output of the burner. For example, as seen in FIG. 15A, the markings may include a "LOW" setting and a "HIGH" setting, and a range of heat outputs between those two settings. It can also be seen in FIG. 2B that the valve shaft 12 has a curved portion and a straight portion, forming a "D" shape. The valve shaft is inserted into a similarly D-shaped opening in a control knob such that rotation of the control knob will result in rotation of the valve shaft which, in turn, controls the rate at which gas flows through the main valve.

Figure 3B:
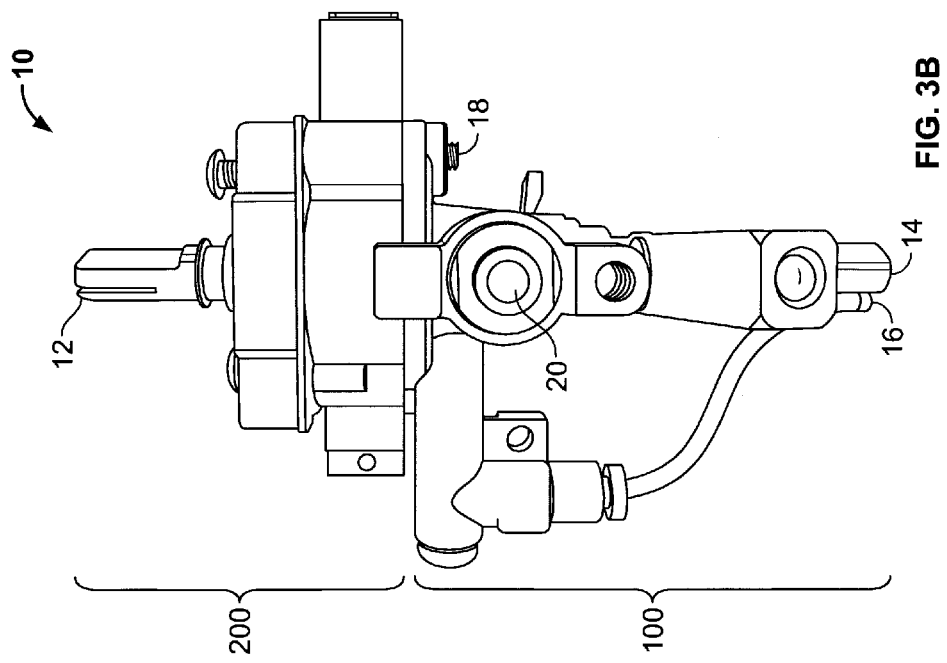
FIGS. 3A-B provide perspective and top plan views, respectively, of a variation of the quick sear valve assembly in accordance with the invention.
Figure 3A:
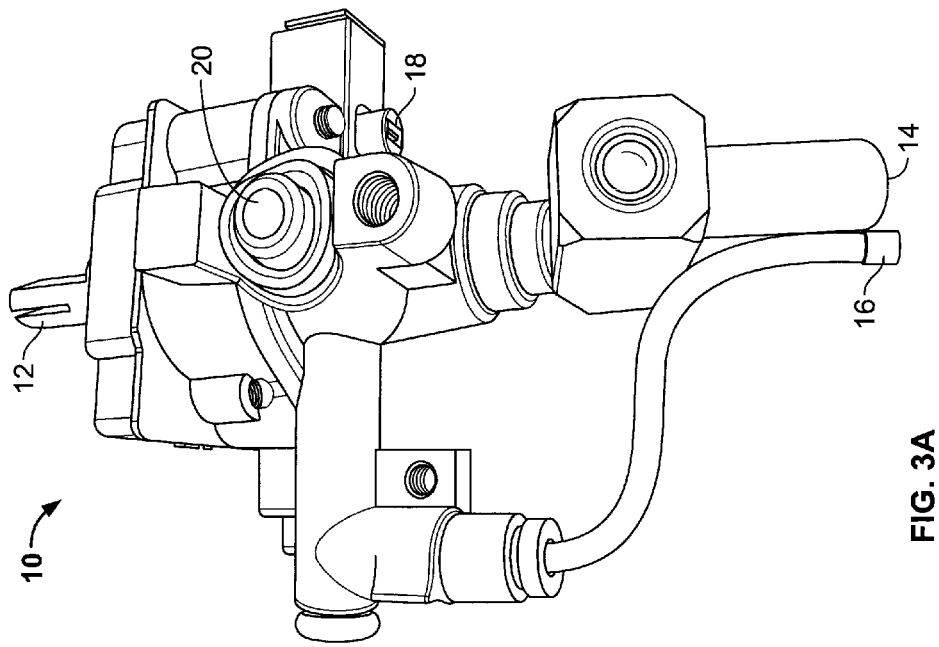

FIGS. 3A-B depict a variation of the quick sear valve assembly 10. In this embodiment, the bypass valve 16 has been extended so that its opening is positioned proximate the opening of the main valve 14. By placing the bypass valve very close to the main valve, both valves can be inserted into a single, smaller opening in a burner.

In FIG. 3B, it can be seen that the quick sear valve assembly 10 can be divided into two parts, a valve body 100 and a shaft body 200. In the following figures, an exemplary embodiment of the valve body will be discussed in greater detail to provide a description of one implementation of the quick sear valve assembly.

Figure 4A:
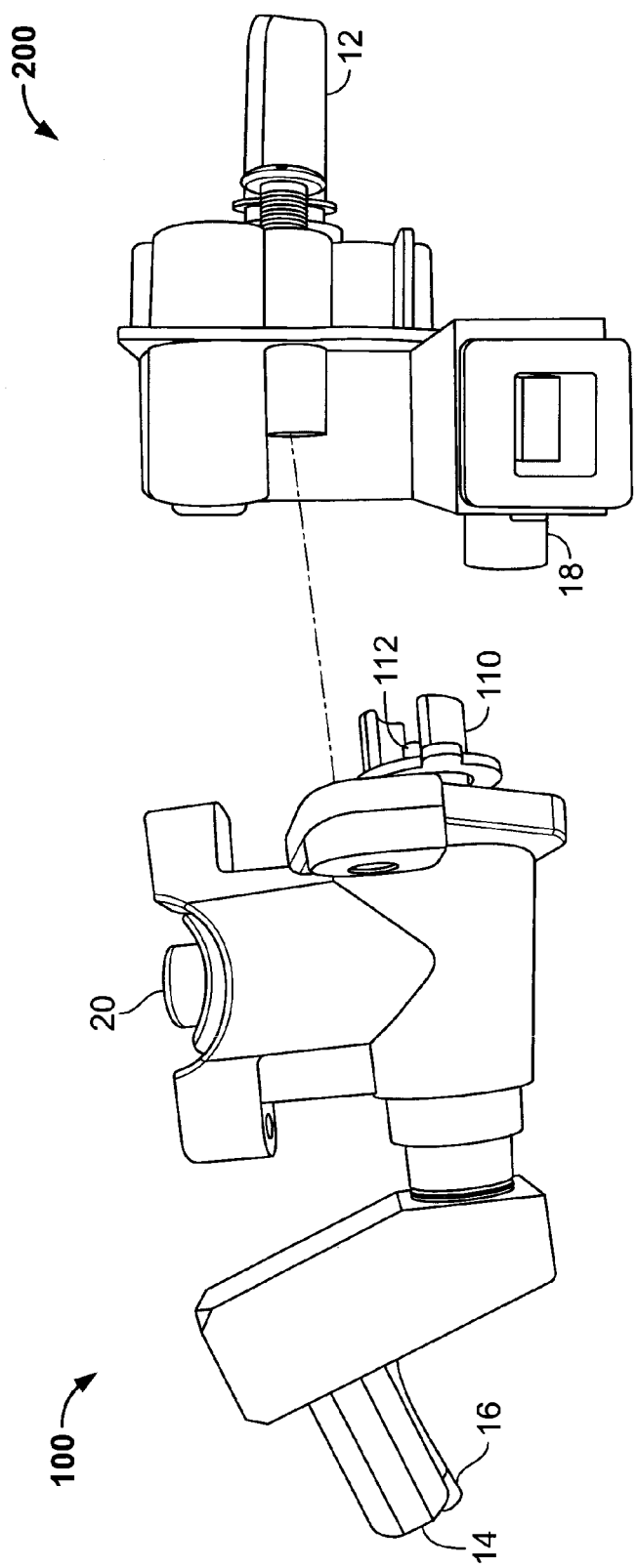
FIG. 4A provides a partially deconstructed view of the quick sear valve assembly of FIG. 3 divided into a valve body and a shaft body.

FIG. 4A depicts the quick sear valve assembly of FIG. 3B divided into two pieces, a valve body 100 and a shaft body 200. The shaft body houses the valve shaft 12. The valve body houses the gas inlet 20, the main valve 14, and the bypass valve 16. The valve body also houses a valve core 110 having a plunger 112. FIGS. 4B and 4C provide closer looks at the inner-workings of the valve body and the shaft body, respectively.

In FIGS. 4A and 4B, it can be seen that the valve core 110 has a cylindrical opening formed by two walls. The two walls are separated so as to form a slot that is shaped to receive an inner-end of the valve shaft 12 (shown in FIG. 4C). The inner-end of the valve shaft is inserted into the slot of the valve core, and comes into contact with the plunger 112. When the valve shaft is rotated (e.g., by a user rotating a control knob), the valve core is rotated. When the valve shaft is pushed in, the plunger is pushed inwardly. As will be described in greater detail below, the inward displacement of the valve shaft, and the resulting inward displacement of the plunger, causes fuel to flow through the bypass valve 16 for quick sear functionality.

Figure 5:
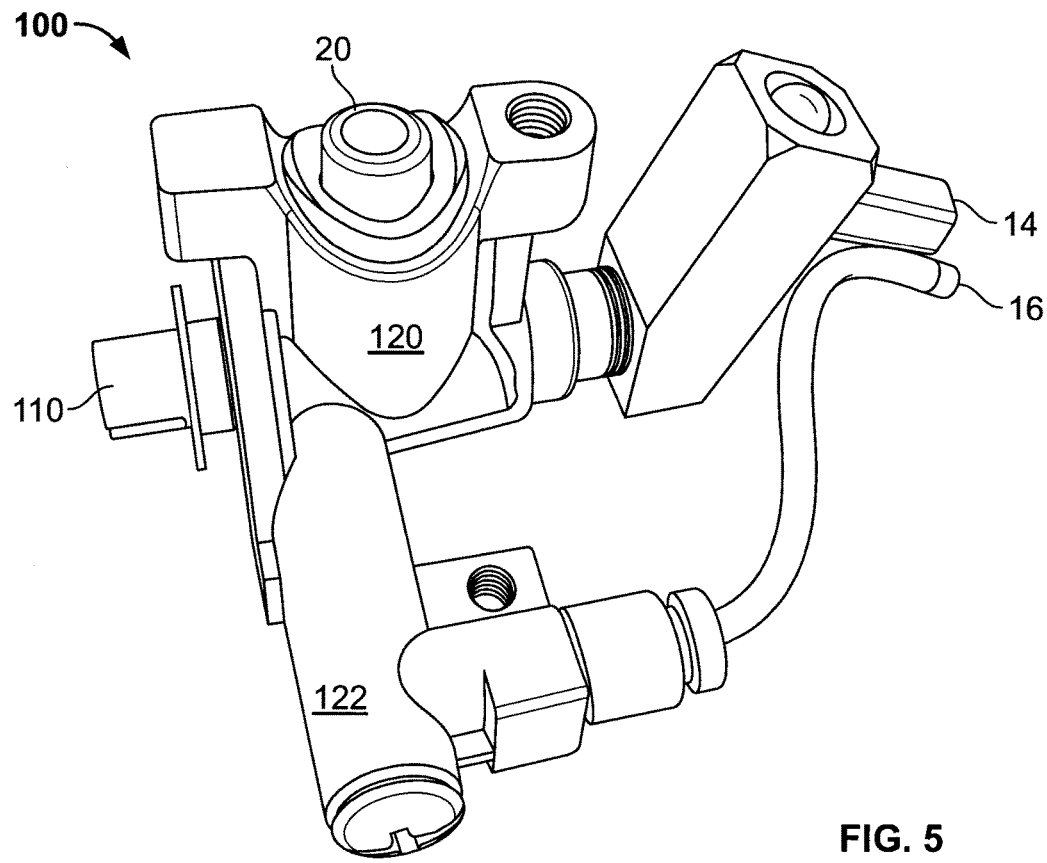
FIG. 5 provides a perspective view of the valve body of FIG. 4B.

FIG. 5 provides a perspective view of the valve body 100. Fuel flows into the valve body via the gas inlet 20, and fills a main chamber 120. The main chamber feeds fuel into the main valve 14, which is inserted into a burner and provides fuel to the burner. Adjacent the main chamber is a bypass chamber 122. In normal operation, the bypass chamber is blocked off from the main chamber, and fuel does not flow through the bypass chamber. However, when the user presses inward on the valve shaft 12, this causes a corresponding displacement of the plunger 112, which opens a path from the gas inlet to the bypass chamber.

Figure 6A:
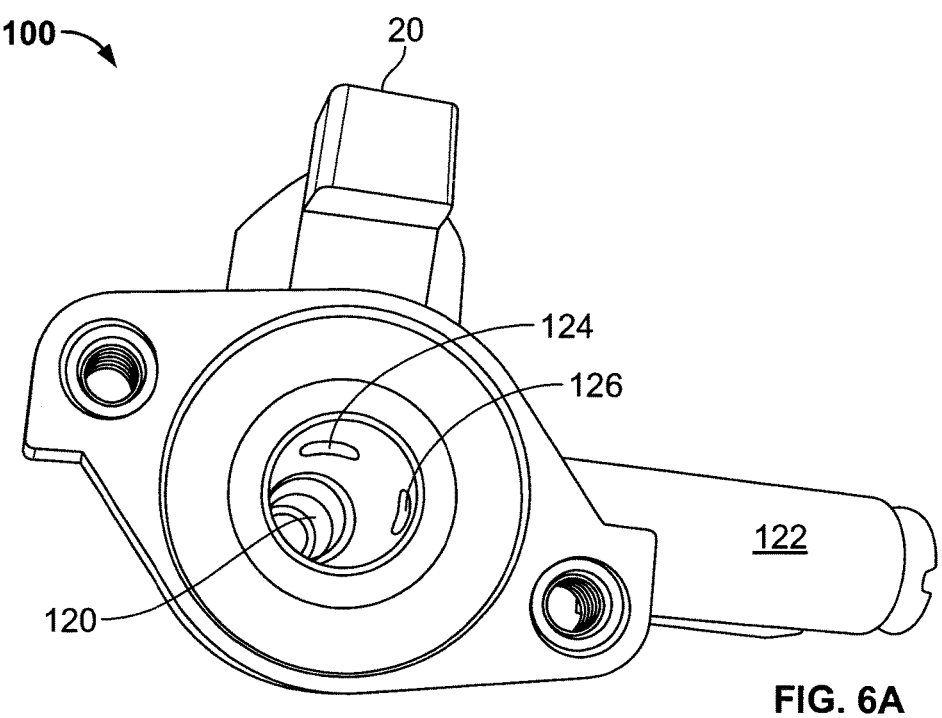
FIG. 6A provides an internal view of the valve body of FIG. 5.
Figure 6B:
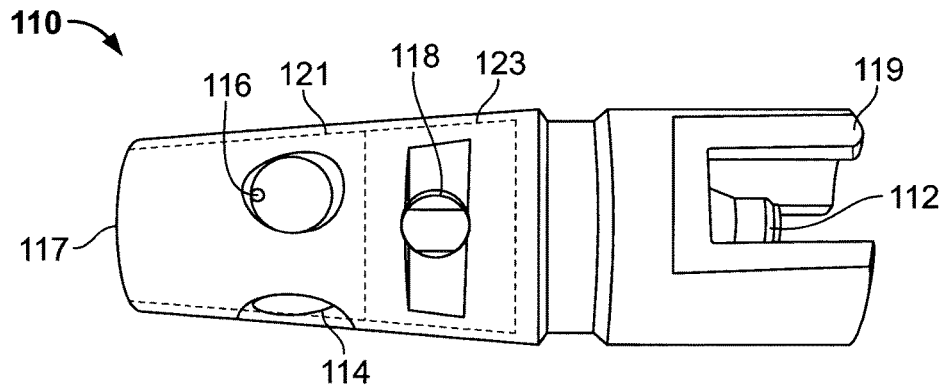
FIG. 6B provides a perspective view of a valve core from the valve body of FIG. 6A.
Figure 6C:
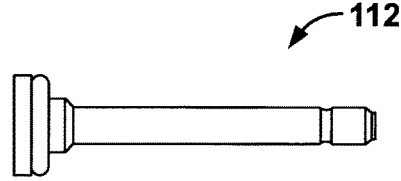
FIG. 6C provides a perspective view of a plunger component within the valve core of FIG. 6B.

FIGS. 6A-C provide greater detail as to how the bypass chamber 122 is opened and closed to control the quick sear function. In FIG. 6A, the valve core 110 has been removed from the valve body 100, revealing the inside of the main chamber 120. Along the walls of the main chamber are two openings 124, 126. A gas inlet opening 124 is connected to the gas inlet 20, and provides a path for fuel to enter through the gas inlet into the main chamber. A bypass chamber opening 126 connects the main chamber to the bypass chamber. The far end of the main chamber, which is not seen in the figure, is open, and is the opening through which fuel exits the main valve 14 to provide fuel to a grill burner.

FIG. 6B shows the valve core 110, and FIG. 6C shows a plunger 112 that is positioned within the valve core. The valve core has a valve end 117 that opens into the main chamber 120, and a shaft end 119 that interacts with the valve shaft 12 (as shown in FIGS. 4A-C). The valve core is shaped to fit snugly within the main chamber 120 such that fuel that enters through the gas inlet 20 will flow into the valve core and cannot leak out around the edges of the valve core.

The valve core 110 has three fuel openings. A high fuel opening 114 has a large aperture to allow a large amount of fuel to pass through (i.e., corresponding to a "HIGH" heat setting on the grill). A low fuel opening 116 has a small aperture to allow a lesser amount of fuel to pass through (i.e., corresponding to a "LOW" heat setting on the grill). A bypass fuel opening 118 connects to the bypass chamber 122 to provide fuel to the bypass chamber during quick sear functionality. The valve end 117 is open so as to provide fuel to the main valve 14. The valve core is hollow from the valve end to just beyond the high fuel opening 114, creating a main core chamber 121. Adjacent the main core chamber is a bypass core chamber 123.

When the control knob is set to a "HIGH" setting, the high fuel opening 114 lines up with the gas inlet opening 124 in the main chamber 120 (FIG. 6A). With the high fuel opening's large aperture, a large amount of fuel is able to flow from the gas inlet 20 into the valve core 110. The fuel is then directed out of the valve core into the main valve 14 via the open valve end 117. When the control knob is rotated to a lower heat setting, the valve core turns and the high fuel opening becomes less aligned with the gas inlet opening, resulting in a smaller aperture through which fuel may enter the valve core and less fuel being fed to a burner. When the control knob is turned all the way to the lowest heat setting, the low fuel opening 116 becomes aligned with the gas inlet opening.

The main core chamber 121 is open on the valve end 117 and enclosed on the other end by the plunger 112. The plunger is spring-loaded such that the spring force causes the plunger to create a tight seal within the valve core 110, preventing fuel from flowing beyond the main core chamber into the bypass valve core 123. In normal operation, the plunger seals the main core chamber and causes all fuel entering the valve core to exit via the valve end 117. However, when the user initiates the quick sear functionality by pressing the control knob (and, thereby, the valve shaft) inward, the plunger is pushed into the main core chamber, breaking the seal, and opening the bypass core chamber.

Figure 7A:
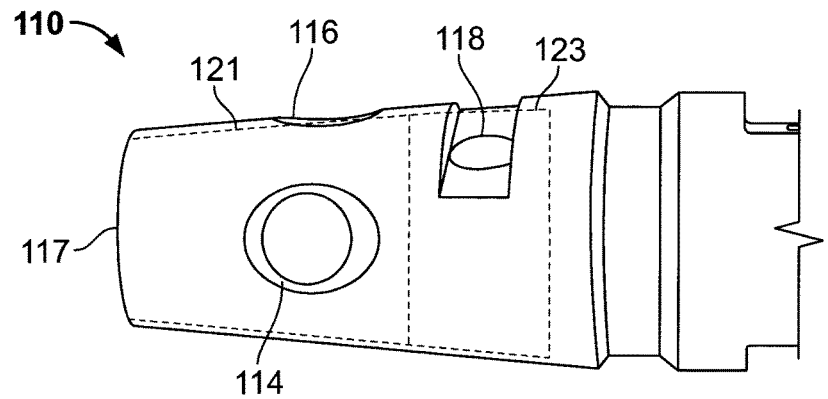
FIGS. 7A-B provide close-up views of the valve core of FIG. 6B in a non-bypass and bypass mode, respectively.
Figure 7B:
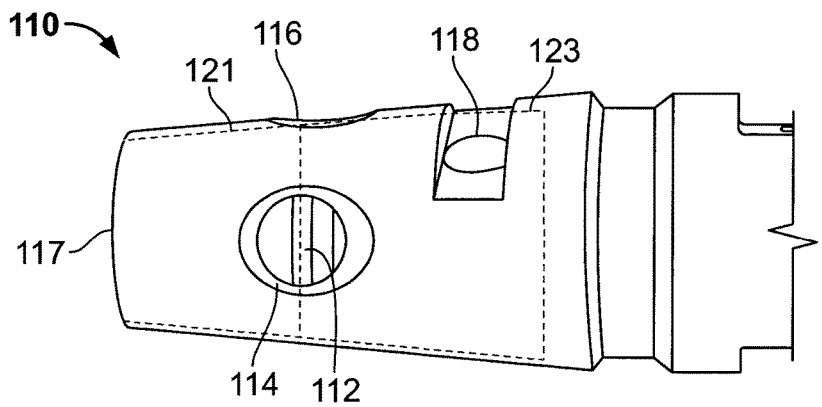

FIGS. 7A-B show close-up views of the high fuel opening 114. In FIG. 7A, the plunger 112 has not been displaced, and is closing off the bypass core chamber 123 so that fuel can only flow out of the valve end 117. In FIG. 7B, the plunger has been displaced inward, so that it can be seen in the high fuel opening. In this state, fuel enters the high fuel opening and flows both into the main core chamber 121 and the bypass core chamber 123. Fuel entering the bypass core chamber can then flow out of the bypass fuel opening 118 into the bypass chamber 122 via the bypass chamber opening 126 (FIG. 6A).

In this embodiment, the quick sear function may only be utilized when the grill is set to the "HIGH" heat setting. This is due to two features in the depicted embodiment. First, the low fuel opening 116 is positioned proximate the valve end 117 such that even when the plunger 112 is displaced inwardly, it does not reach the low fuel opening, and the plunger continues to block fuel from entering the bypass core chamber 123. Additionally, the bypass fuel opening 118 is shaped and positioned such that it lines up with the bypass chamber opening 126 only when the valve core 110 is in the "HIGH" heat position (i.e., the high fuel opening 114 lines up with the gas inlet opening 124). When the valve core is rotated to a lower heat position, the bypass chamber opening is no longer aligned with the bypass fuel opening. Although the figures depict a presently preferred embodiment, it will be understood that the quick sear function does not necessarily have to be limited to the "HIGH" heat setting. For example, this may be adjusted by changing the positioning or the size of the bypass fuel opening or the placement of the low fuel opening.

Figure 8:
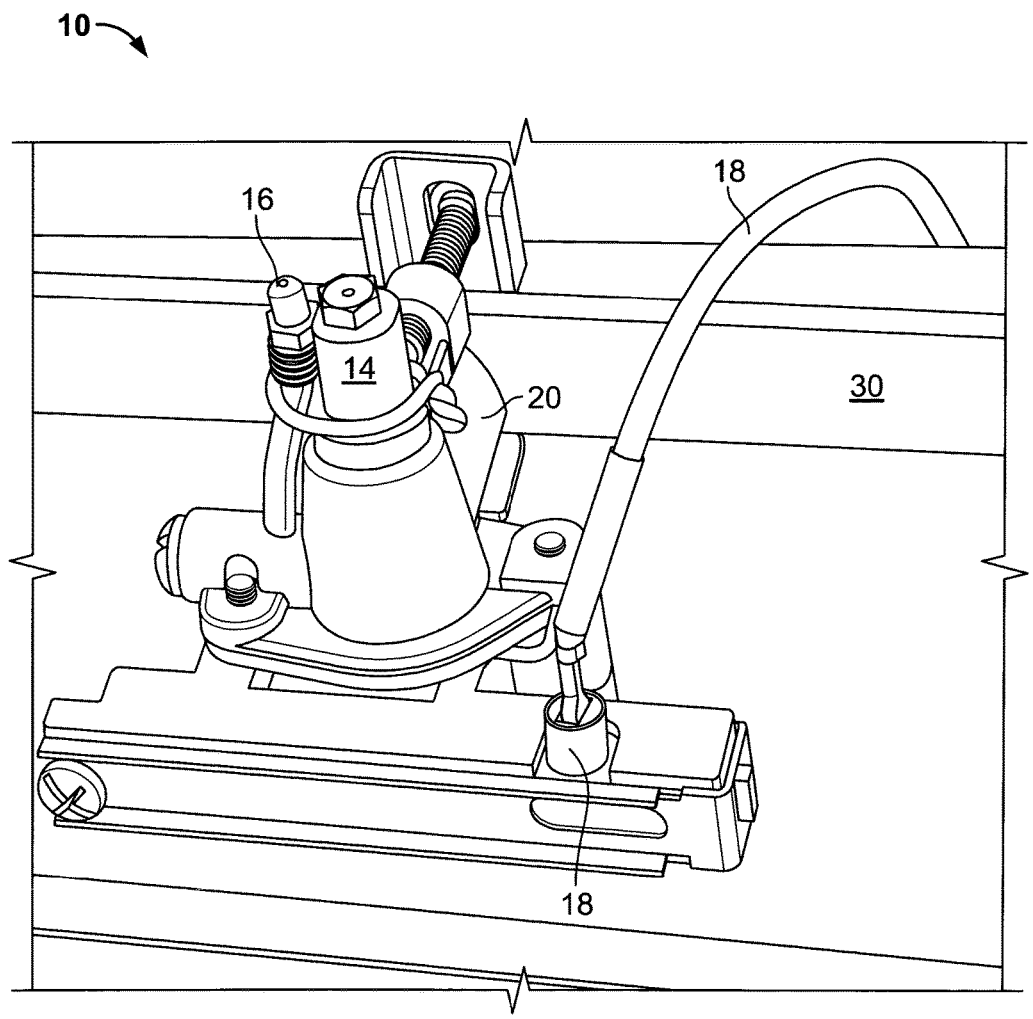
FIG. 8 is a perspective view of another variation of a quick sear valve assembly in accordance with the invention.

FIG. 8 depicts a variation of the quick sear valve 10 that is similar to that shown in FIGS. 3A-B, with the opening of the bypass valve 16 positioned next to the main valve 14. In the figure, the gas inlet 20 is connected to a fuel line 30 that provides fuel to the quick sear valve assembly.

Figure 9:
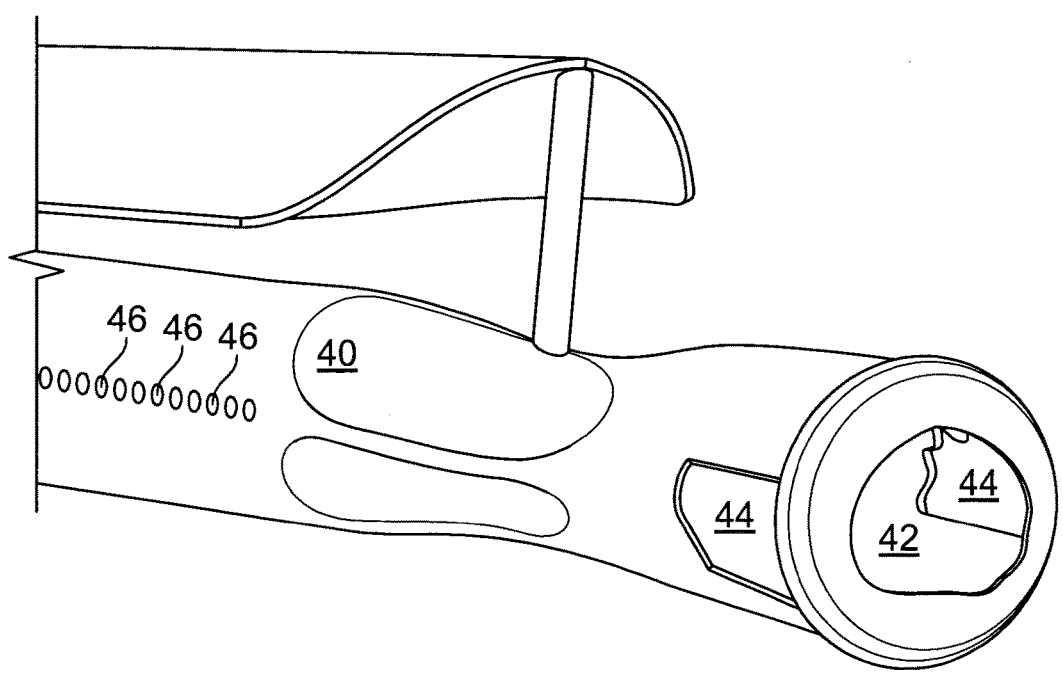
FIG. 9 depicts a quick sear burner that may be used in conjunction with the quick sear valve assembly of FIG. 8.

FIG. 9 depicts a burner 40 that is adapted to receive fuel from the quick sear valve assembly 10 of FIG. 8. The burner includes a valve inlet 42 to receive the main valve 14 and the bypass valve 16. In alternative embodiments, there may be two separate valve inlets, one to communicate with the main valve, and another to communicate with the bypass valve, particularly when the main valve and the bypass valve are not very close together. Proximate the valve inlet are two side vents 44. These side vents allow for air to flow through the burner to provide oxygen to ignite the fuel within the burner. Along the burner are a plurality of flame perforations 46 to allow ignited fuel to exit the burner and heat the grill.

Figure 10:
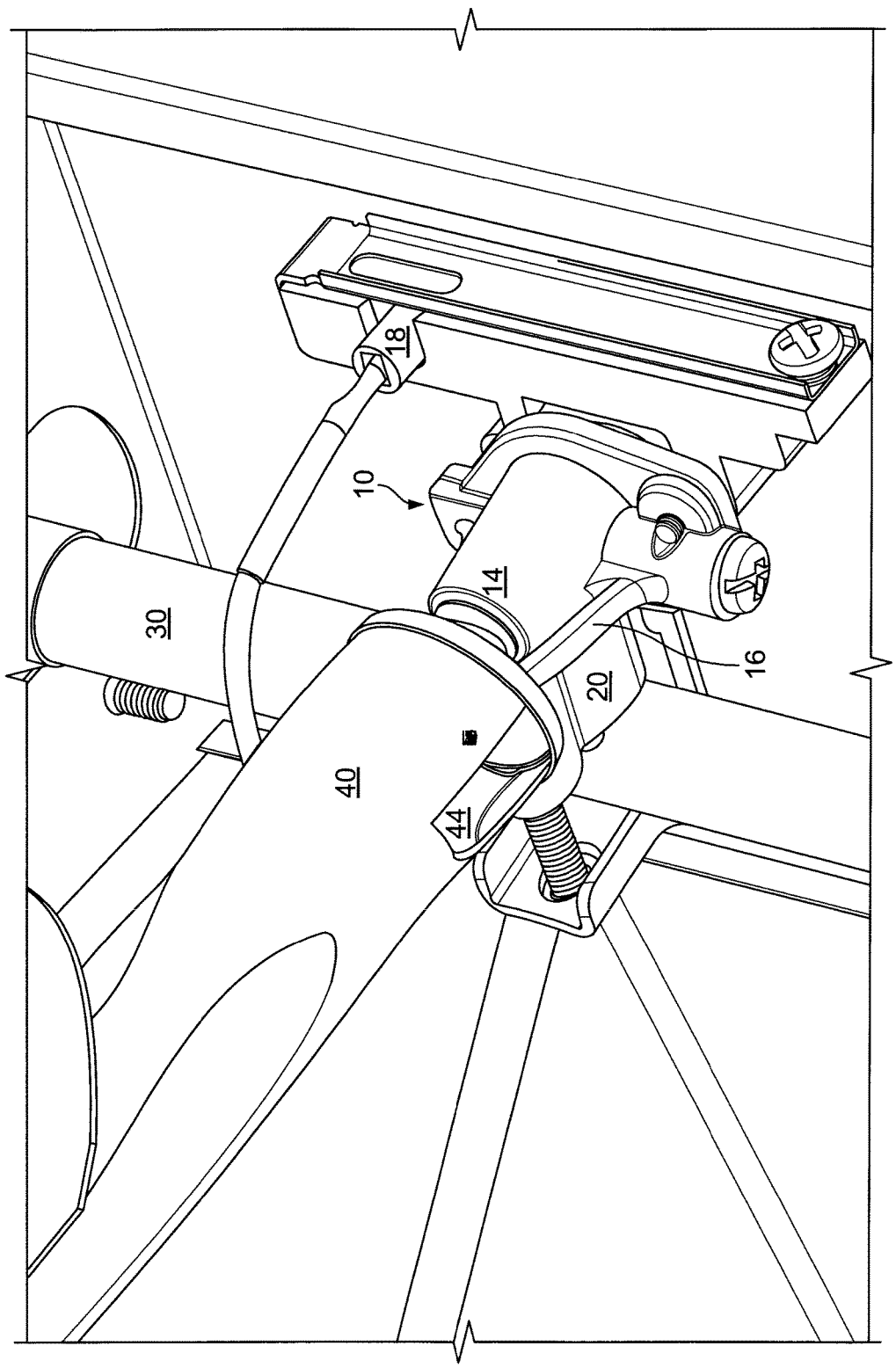
FIG. 10 depicts the quick sear burner of FIG. 9 positioned over the quick sear valve assembly of FIG. 8.

FIG. 10 depicts the quick sear valve 10 of FIG. 8 inserted into the burner 40 of FIG. 9. More particularly, the main valve 14 and the bypass valve 16 have been inserted into the burner via the valve opening 42.

Figure 11A:
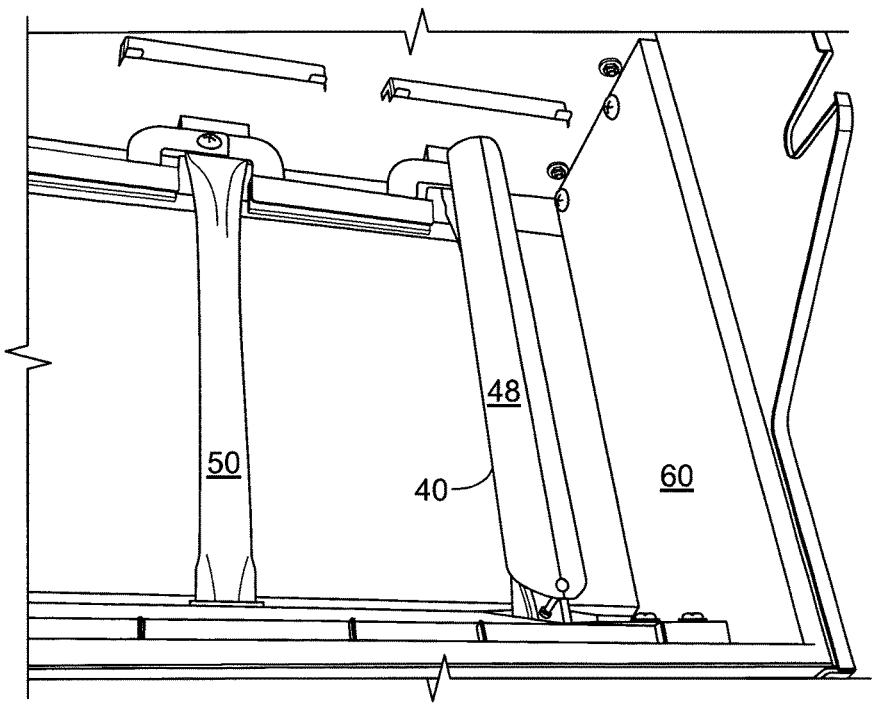
FIGS. 11A-B depict a grill firebox having a regular burner and a quick sear burner, in accordance with the presently preferred embodiment of the invention.
Figure 11B:
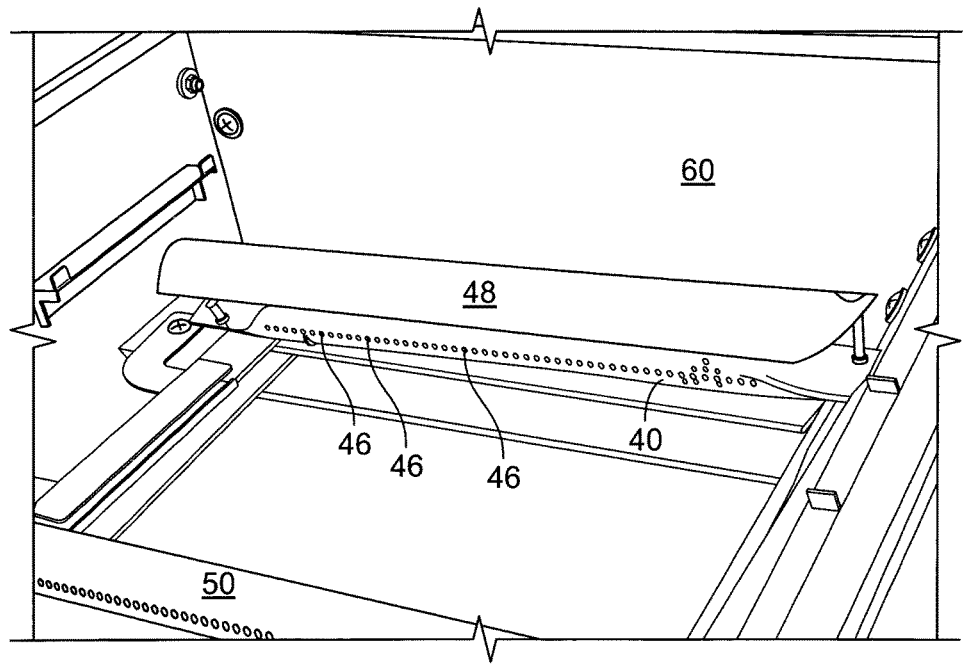

FIGS. 11A and B provide perspective views of a grill firebox 60 housing two burners 40, 50. In this embodiment, the left burner 50 is a normal burner that is not equipped with the "quick sear" function (i.e., is not in communication with a quick sear valve assembly), and the right burner 40 is a "quick sear" burner (i.e., is in communication with a quick sear valve assembly capable of performing the "quick sear" function). In alternative embodiments, a plurality of burners or all of the burners within a grill may be in communication with a plurality of quick sear valve assemblies and capable of performing the "quick sear" function. In the depicted embodiment, the "quick sear" burner has a quick sear heat shield 48 positioned above it. Heat tends to rise directly upward from the burner, which can cause a hot spot directly above the burner. The quick sear heat shield acts to disperse the heat emitted from the quick sear burner in a lateral direction, spreading the heat more evenly near the cooking surface, while also protecting the quick sear burner from falling grease and debris which can affect the heat output performance of the burner. The depicted heat shield is also relatively narrow such that the flames emitted from the burner during use of the "quick sear" functionality are able to reach around and above the quick sear heat shield so as to come into direct or near direct contact with a cooking surface on the grill.

Figure 12:
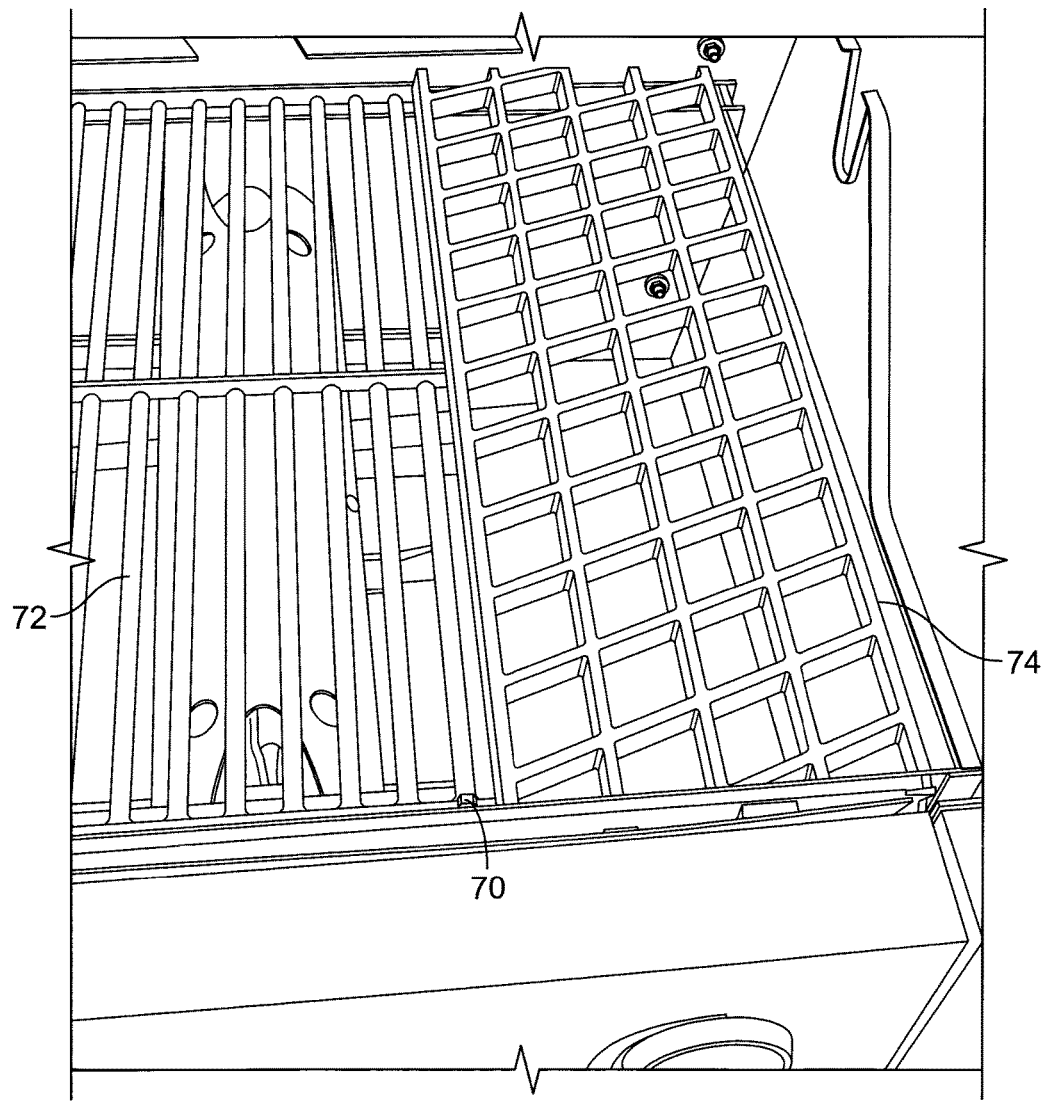
FIG. 12 depicts a cooking surface positioned over the quick sear burner of FIGS. 11A-B.

FIG. 12 provides a perspective view of a cooking surface 70 positioned within the firebox 60, over the burners 40, 50, shown in FIG. 6. It can be seen that the cooking surface comprises two different kind of grates, a non-sear grate 72 positioned over the normal burner 50, and a sear grate 74 positioned over the quick sear burner 40. The sear grate may be such that it is able to withstand higher heat output as compared to the normal grate. The sear grate may also be shaped such that when the quick sear function is utilized, the sear grate creates a desirable sear pattern on the feed being seared. In FIG. 12, the sear grate has a diamond pattern so as to create a diamond sear pattern on food. The cooking surface may comprise any number of different areas or grates, and one or more burners in a grill may be equipped with the quick sear functionality.

Figure 13A:
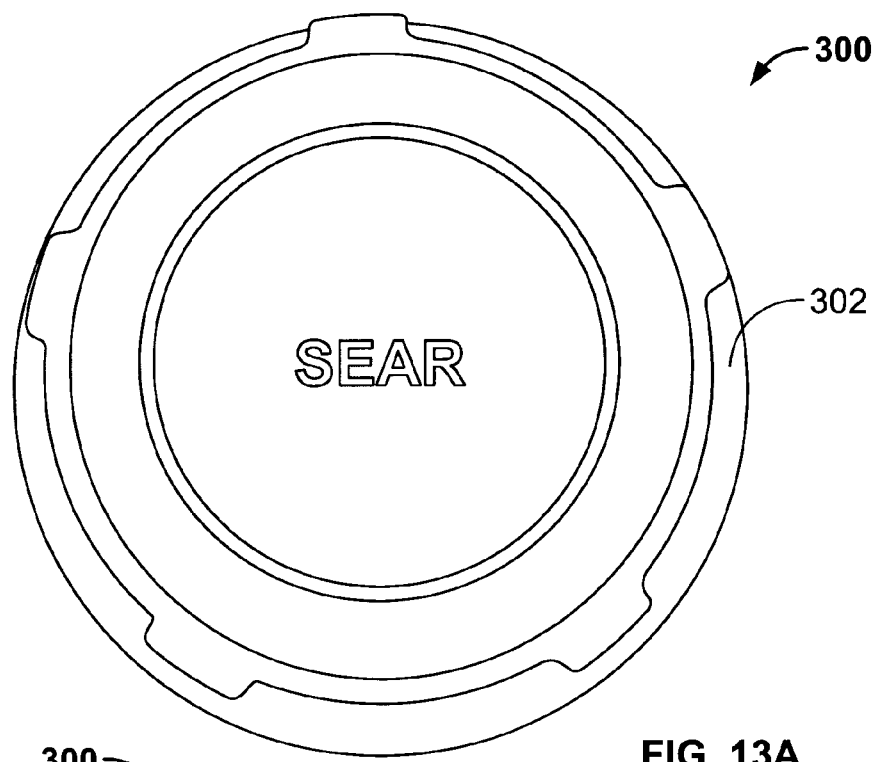
FIGS. 13A-B provide top and bottom perspective views, respectively, of a quick sear control knob that may be used with a quick sear grill in accordance with the presently preferred embodiment of the present invention.
Figure 13B:
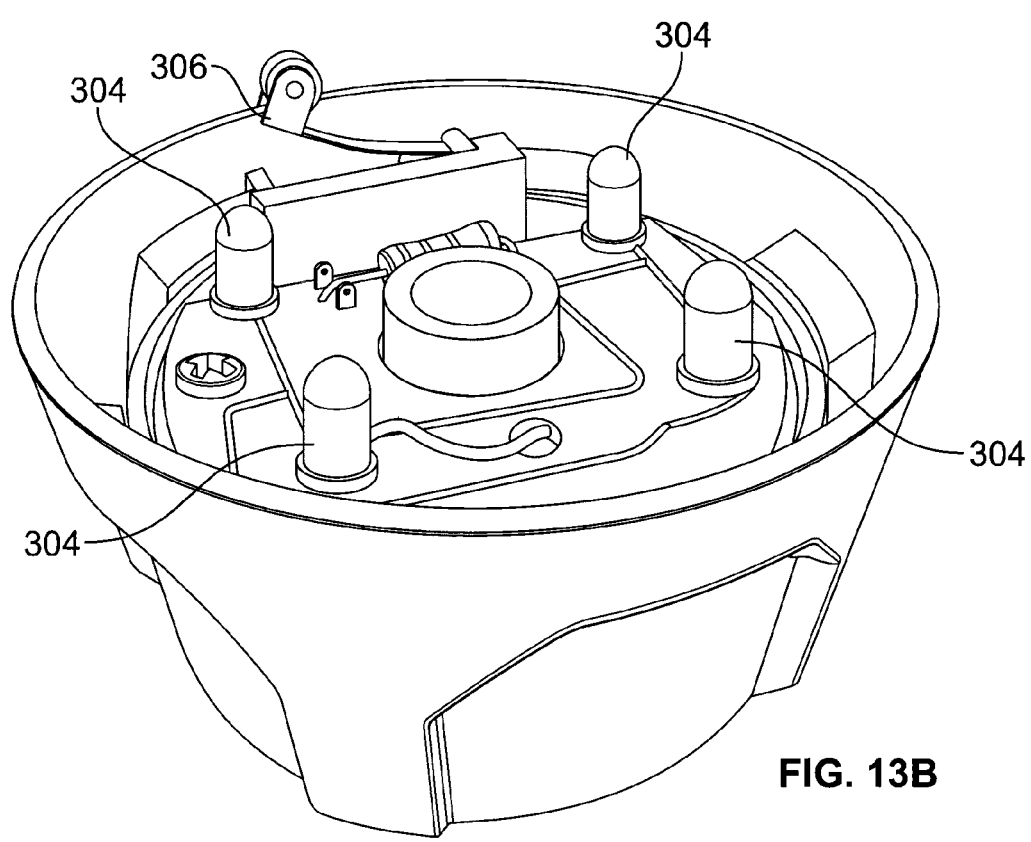

FIGS. 13A-B provide top and bottom perspective views, respectively, of a quick sear control knob 300 that may be used with the quick sear grill disclosed herein. The depicted quick sear control knob indicates to a user when the quick sear functionality is triggered. The quick sear control knob in FIGS. 13A-B emits light when the control knob is displaced inwardly to initiate the quick sear function. In FIG. 13B, four LEDs 304 are provided to provide a visual light indication of when the quick sear function is triggered. The four LEDs are connected to a switch 306. The switch is shaped and/or positioned such that in a resting position, the circuit is open and the LEDs remain off. When the control knob is displaced inward, the switch is pushed downward and closes the circuit, causing the LEDs to turn on. The shown quick sear control knob also includes a translucent face plate 302 which reflects and/or refracts the light emitted by the LEDs to enhance the visual effect.

As described above, it may be desirable to implement a timer mechanism to be used with the disclosed quick sear functionality. In one embodiment, a timer may be placed in communication with the LEDs 304 (or other indicator) such that after a pre-determined period of time, the LEDs indicate to the user how much time has elapsed. For example, when the quick sear functionality is activated, the LEDs 304 may turn on to indicate to the user that the quick sear function is active. After a pre-determined period of time (e.g., one minute) a timer circuit may cause the LEDs to blink or turn off to indicate to the user that one minute has elapsed, and the user should cease the quick sear functionality. Alternatively, a digital or analog timer may be initiated when the quick sear function is initiated, such that the user can see on a digital or analog readout the duration of time that the quick sear function has been active.

Figure 14A:
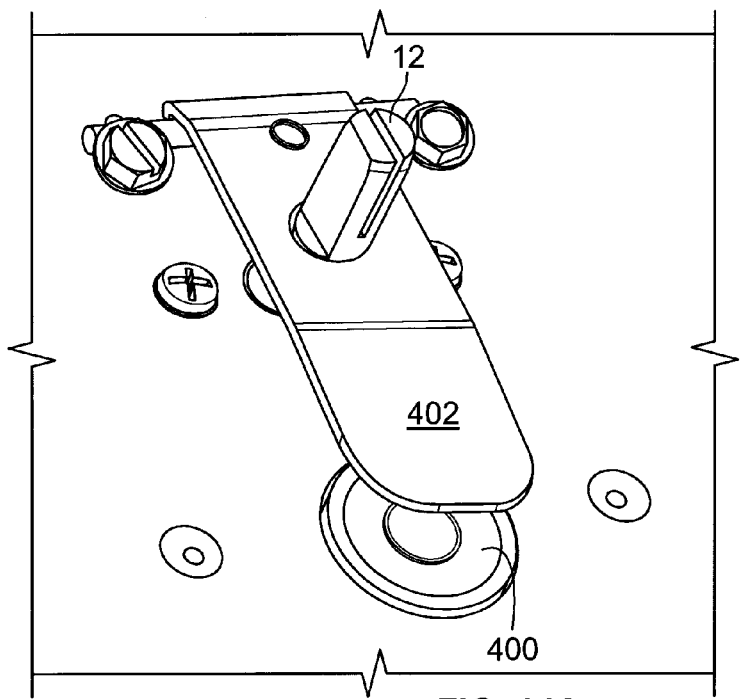
FIG. 14A provides a front-perspective view of a simplified automatic quick sear mechanism, in accordance with one embodiment of the present invention.
Figure 14B:
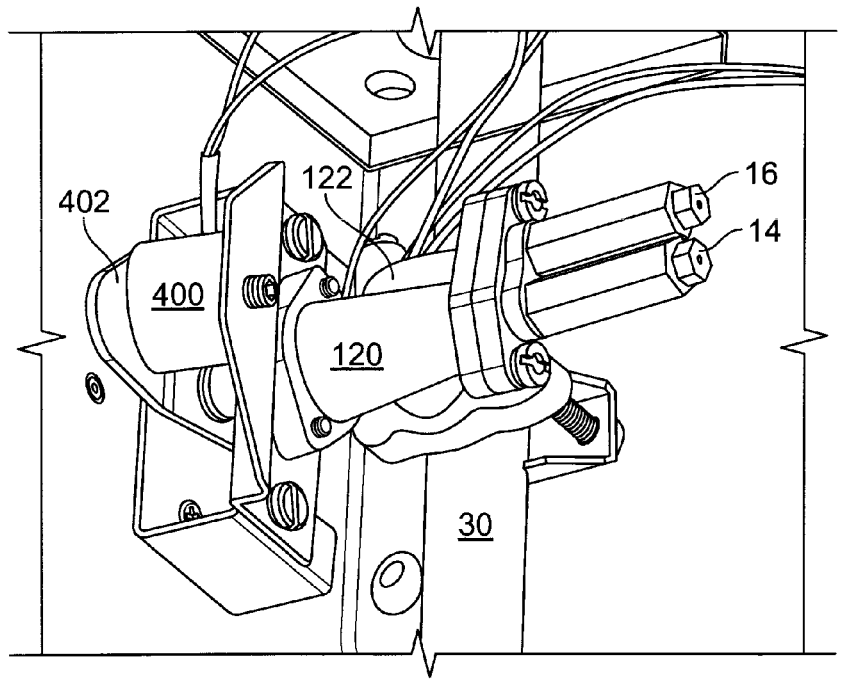
FIG. 14B provides a rear-perspective view of the automatic quick sear mechanism of FIG. 14B.

In a further embodiment, the timer mechanism may be used to implement an automatic quick sear function such that the user does not have to stay near the grill, holding the control knob in, to apply the quick sear functionality. One possible implementation of the automatic quick sear function is depicted in FIGS. 14 and 15. FIG. 14A shows a front-perspective view of a simplified automatic quick sear mechanism to demonstrate its basic function. A lever 402 is secured to the valve shaft 12 such that when the control valve is pushed in to activate the quick sear function, the lever 402 is also pushed down and placed in magnetic contact with an electromagnet 400. The electromagnet 400 magnetically holds the lever 402 in place, thereby holding the valve shaft 12 in place and keeping the quick sear function active for as long as the electromagnet is magnetically charged. The magnetic charge of the electromagnet 400 is controlled by a power source and a timer, such that when a pre-determined period of time has passed, power to the electromagnet is cut off, which then releases the magnetic hold on the lever 402, allowing the valve shaft 12 to decompress back to its normal state, and turning off the quick sear function. In this way, a user can push the valve shaft 12 in to activate the automatic quick sear function, and then leave the grill, knowing that quick sear function will automatically turn after a pre-determined period of time. FIG. 14B shows a rear-perspective view of the automatic quick sear mechanism installed with a quick sear valve assembly.

FIG. 15A shows a front perspective view of an electronic circuit board 404 that may comprise part of the automatic quick sear mechanism. As discussed above with respect to FIG. 14A, the valve shaft 12 is secured to the lever 402 (seen in FIGS. 14A and B) so that when the valve shaft 12 is pushed in to activate the quick sear function, the lever 402 moves with the valve shaft 12 and comes into magnetic contact with the electromagnet 400. If power is supplied to the electromagnet 400, the electromagnet will hold the lever 402 in place and continue to activate the quick sear function for a predetermined amount of time. The circuit board 404 controls power to the electromagnet 400 to ensure that it is only charged at the appropriate time and for the appropriate duration of time, the specifics of which will now be discussed in greater detail.

The circuit board 404 controls the automatic quick sear mechanism by controlling power to the electromagnet 400. When power flows through the electromagnet 400, it becomes magnetically charged. With sufficient current flow, the electromagnet 400 becomes sufficiently magnetically charged as to able to hold the lever 402 in place to initiate automatic quick sear functionality. However, if power does not flow through the electromagnet 400, then the lever 402, even when placed in contact with the electromagnet, will not be held in place and the valve shaft 12 will revert back to its normal state once inward pressure is no longer applied by the user. The electronic circuit board 404 contains two switches 408, 410, which play different roles in this function.

In order to control the length of time for which the automatic quick sear function may be activated, the circuit board 404 includes a timer circuit and a switch 410. Once the switch 410 is closed, power is provided to the electromagnet 400 and the timer circuit is activated and counts down a pre-determined amount of time. Once the timer circuit determines that the pre-determined period of time has passed, power flow to the electromagnet 400 is shut off, which, in turn, releases the lever 402 and automatically ceases the quick sear function.

Figure 15B:
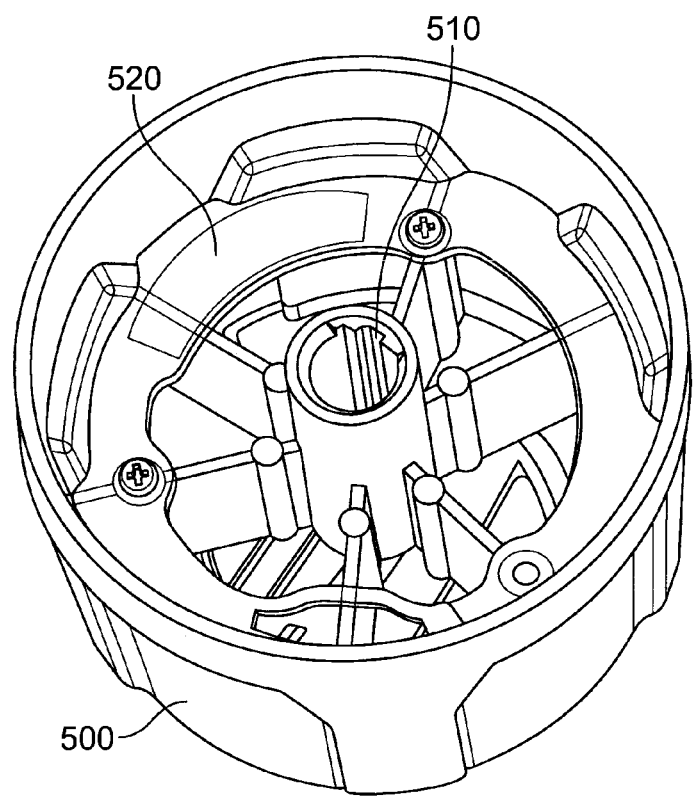
FIG. 15B provides an internal view of a control knob that may be used in conjunction with the circuit board of FIG. 15A.

FIG. 15B shows the rear of a control knob 500, which is used to control the valve shaft 12. The control knob 500 has a D-shaped opening 510, which is configured to be placed over the D-shaped valve shaft 12. When the control knob 500 is rotated, the valve shaft 12 rotates, thereby adjusting the level of gas flowing into the burners. When the control knob 500 is pushed in, the valve shaft 12 is also pushed in, which, given the correct conditions, will activate the quick sear function. The control knob 500 includes a raised portion 520, which interacts with the two switches 408, 410 on the electronic circuit board 404. The raised portion 520 and the switches 408, 410 are configured such that when the control knob 500 is not pushed in, the raised portion 520 will not contact the switches 408, 410 and the control knob 500 may be rotated in any direction without the switches being pushed closed. However, when the control knob 500 is pushed in, the raised portion 520 will be pushed in towards the circuit board 404 and can come into contact with the switches when rotated to the correct position, causing the switches to close.

The switch 410 and the raised portion 520 are positioned such that the raised portion is positioned directly above the switch 410 when the control knob 500 is rotated to the "HIGH" heat position. In this embodiment, the switch 410 will be pushed closed by the raised portion 520 when the control knob 500 is set to "HIGH" and then pushed in. As such, the automatic quick sear function can only be activated when the control knob 500 is turned to the "HIGH" heat position.

Conversely, switch 408 is positioned such that it comes into contact with the raised portion 520 when the control knob 500 is pushed in while in the "OFF" position. Grills are generally turned on by turning the control knob 500 from an "OFF" position to the "HIGH" position. As a safety feature, grills commonly require a user to push in the control knob in order to turn the grill on. It can be seen that this safety feature may cause the automatic quick sear function to activate every time the grill is turned on, since the control knob 500 will be compressed as the user turns the control knob from "OFF" to "HIGH." It may be desirable to prevent this particular inward movement of the valve shaft 12 from activating the automatic quick sear function, since the user is simply trying to turn the grill on, and not trying to use the automatic quick sear function. The switch 408 is a "delay" switch to address this situation. When the delay switch 408 is closed, it creates a delay effect such that the electromagnet 400 cannot be charged for a pre-determined amount of time. For example, the delay switch 408 may activate a two-second delay so that the electromagnet 400 cannot be powered for the two seconds immediately after the delay switch 408 has been closed. The delay switch 408 ensures that when the control knob 500 is pushed inward and then turned from "OFF" to "HIGH" to turn the grill on, power is not supplied to the electromagnet 400 and the automatic quick sear function is not activated. The delay switch 408 also provides greater control to the user by allowing them to shut off the automatic quick sear function manually. If a user wishes to end the automatic quick sear function manually before the timer circuit automatically does so, the user can compress the control knob 500 and turn the control knob to the OFF position, thereby closing the delay switch 408 and ceasing power flow to the electromagnet 400. The electronic circuit board 404 also includes three LEDs, 406, which play a similar role to the LEDs 304 discussed with respect to FIGS. 13A and 13B. The LEDs 406 light up to indicate to the user that quick sear functionality is active.

Figure 16:
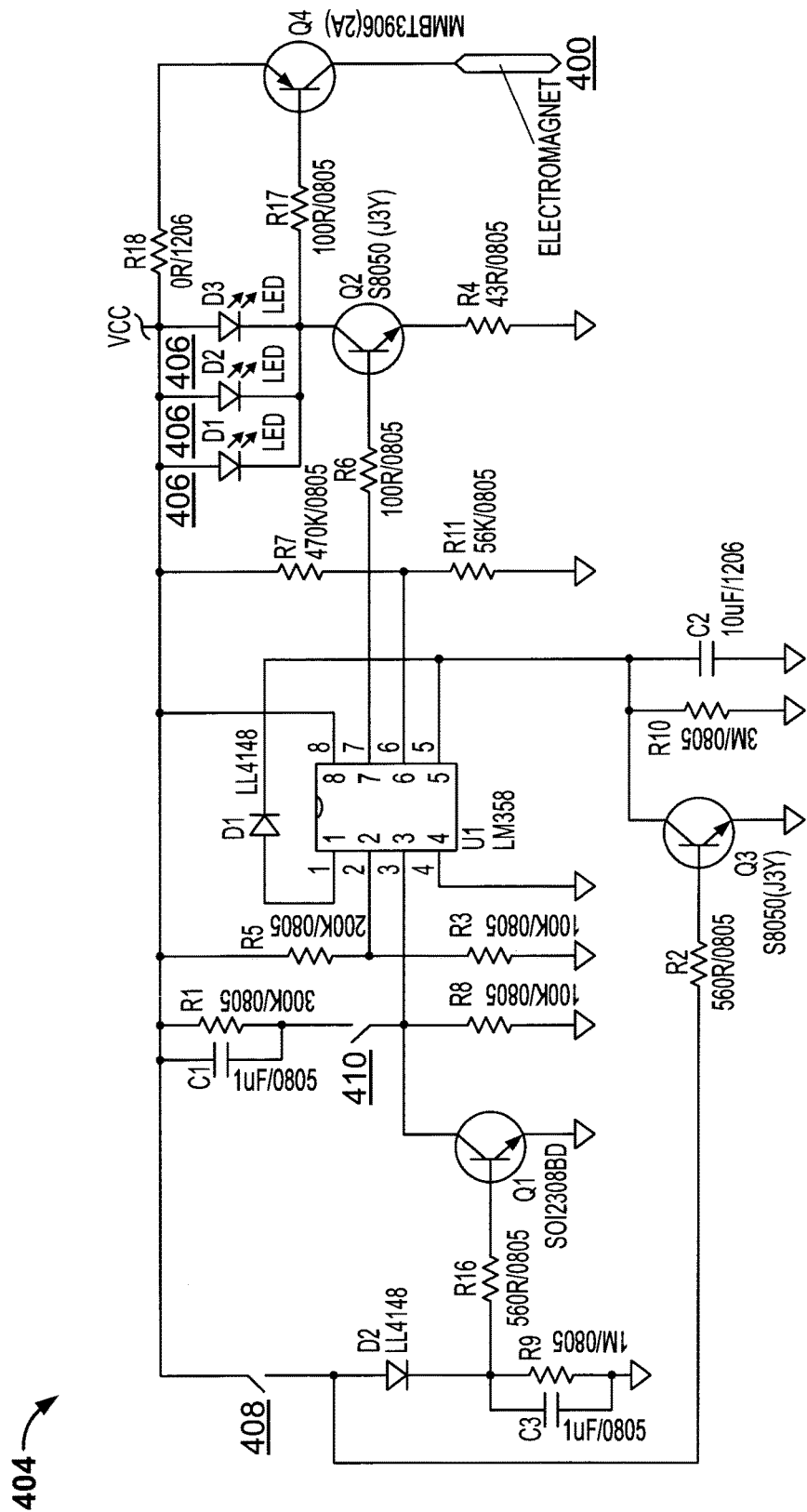
FIG. 16 provides a circuit diagram of the circuit board of FIG. 15A.

FIG. 16 provides an exemplary schematic for the circuit board 404 to demonstrate one way in which these functions may be carried out. When switch 410 is closed, capacitor C1, in conjunction with resistors R1 and R8, create a voltage pulse, which decays over time. The voltage pulse powers the LEDs 406 (through transistor Q2) and the electromagnet 400 (through transistor Q4). The decay of the voltage pulse carries out the timer function such that, after passage of a certain amount of time, the voltage level reaches a threshold and the electromagnet 400 does not have sufficient magnetic charge (or does not have any charge at all) to continue holding the lever 402. Using the components shown, powered by 2-4 AA batteries, the voltage pulse will power these components and provide sufficient magnetic charge to the electromagnetic 400 for about one minute, at which point the LEDs 406 will turn off and the electromagnet 400 will release the lever 402, ending the automatic quick sear function.

It can be also seen in FIG. 16 that when switch 408 is closed, current flows through diode D2 to capacitor C3, resistors R9 and R16, and into the base of transistor Q1. These components carry out the time delay feature, such that when switch 408 is closed, for a period of approximately 1.5 to 2 seconds, closing switch 410 does not create the required voltage pulse through capacitor C1 and resistors R1 and R8, and the automatic quick sear function cannot be carried out during the delay period.

Although the invention has been disclosed with reference only to particular embodiments, those of ordinary skill in the art will appreciate that various modifications can be made without departing from the invention. Therefore, the present invention should not be seen as limited to the forms shown, which are illustrative rather than restrictive. Accordingly, the invention is defined only by the following claims.

The invention claimed is:

1. A grill, comprising:
a firebox;
a quick sear burner positioned in the firebox;
a quick sear valve assembly adapted for fluid communication with the quick sear burner to provide gaseous fuel into the quick sear burner, the quick sear valve assembly comprising a main valve for normal operation of the quick sear burner, and a bypass valve for higher intensity heat output by the quick sear burner than the main valve;
a quick sear actuator to selectively actuate the bypass valve; and
a cooking surface that comprises: a first cooking surface, and a second cooking surface, the second cooking surface positioned above the quick sear burner and having a diamond sear configuration that is a different surface pattern than a surface pattern of the first cooking surface.

2. A cooking appliance, comprising:
a cooking surface;
a burner positioned in association with the cooking surface;
a valve assembly adapted for fluid communication with the burner to provide gaseous fuel into the first burner, the valve assembly comprising:
a main valve for normal operation of the burner, and
a second valve for higher intensity heat output by the burner than the main valve; and
an actuator to selectively actuate the second valve.

3. The cooking appliance as described in claim 2 wherein the cooking surface is part of a firebox, and the second valve is positioned in the firebox.

4. The cooking appliance as described in claim 2 wherein the second valve is a bypass valve that is distinct from the main valve.

5. The cooking appliance as described in claim 2 wherein the second valve is a bypass channel associated with the main valve.

6. The cooking appliance as described in claim 2 wherein the valve assembly comprises:
a first state in which gas is permitted to flow through the main valve into the burner but no permitted to flow through the second valve; and
a second state in which the second valve is actuated by the actuator and gas is permitted to flow through the second valve into the burner, resulting in a higher heat output than the first state.

7. The cooking appliance as described in claim 6 wherein the second state comprises a set of BTU output settings.

8. The cooking appliance as described in claim 7 wherein the set of BTU output settings in the second state are in a range of BTU outputs of 16,500-26,000 BTUs.

9. The cooking appliance as described in claim 8 wherein the first state has BTU outputs in the range of 4,500-12,000 BTUs.

10. The cooking appliance as described in claim 2 further comprising a pull-push solenoid proximate the actuator, and an electronic controller for selectively activating the pull-push solenoid to actuate the second valve.

11. The cooking appliance as described in claim 2 further comprising a control knob associated with the actuator, the control knob having a partially-translucent surface with non-translucent marks having a geometric configuration.

12. The cooking appliance as described in claim 11 further including a light source positioned within the control knob and behind the translucent surface, the light source being selectively activated in association with actuation of the second valve.

13. A valve assembly adapted to be positioned in fluid communication with a burner, comprising:
a first valve;
a second valve;
a gas inlet in communication with both the first valve and the second valve; and
an actuator for actuating the second valve, the actuator configured to switch the valve assembly between at least a first mode in which gas is permitted to flow through the first valve but not the second valve, and a second mode in which the second valve is actuated and gas is permitted to flow through the second valve.

14. The valve assembly of claim 13, further comprising a valve shaft for control of gas flow through the first valve.

15. The valve assembly of claim 14, wherein the second valve is actuated when the valve shaft is set to a particular setting corresponding to maximum particular amount of gas flow through the first valve.

16. The valve assembly of claim 14, wherein: gas flow through the first valve is controlled by rotating the valve shaft, and gas flow through the second valve is controlled by pushing the valve shaft in an axial direction.

17. The valve assembly as described in claim 13 wherein the second valve is a bypass valve that is distinct from the first valve.

18. The valve assembly as described in claim 13 wherein the second valve is a bypass channel associated with the first valve.

* * * * *